(12) United States Patent
Baumberg

(10) Patent No.: US 6,791,540 B1
(45) Date of Patent: Sep. 14, 2004

(54) IMAGE PROCESSING APPARATUS

(75) Inventor: Adam Michael Baumberg, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/586,886

(22) Filed: Jun. 5, 2000

(30) Foreign Application Priority Data

Jun. 11, 1999 (GB) .............................................. 9913687

(51) Int. Cl.$^7$ .......................................... G06T 15/00
(52) U.S. Cl. .................................................... 345/419
(58) Field of Search ............................... 345/419, 418, 345/422

(56) References Cited

U.S. PATENT DOCUMENTS

| | | | |
|---|---|---|---|
| 6,215,496 B1 * | 4/2001 | Szeliski et al. ............. | 345/419 |
| 6,424,351 B1 * | 7/2002 | Bishop et al. .............. | 345/582 |

FOREIGN PATENT DOCUMENTS

| | | | |
|---|---|---|---|
| EP | 0794516 A2 | 9/1997 | ........... G06T/15/00 |
| EP | 0898245 A1 | 2/1999 | ............. G06T/7/00 |

OTHER PUBLICATIONS

"Arbitrary View Generation from Multiple Cameras" by Park et al., Proceeding of Int'l. Conf. on Image Processing 1997, pp. 149–152 vol. 1 XP002129111.
"View Interpolation for Image Synthesis" by Chen et al., Computer Graphics Proceesing, Annual Conf. Series 1993, pp. 279–288, XP002913618.
"Plenoptic Modelling" An Image–Based Rendering System by McMillan et al., Computer Graphics proceedings (SIGGRAPH) 1995, IEEE, pp. 39–46, ISBN 0–89791–701–4.
"View Morphing" by Seitz and Dyer in SIGGRAPH Computer Graphics Proceedings, Annual Conf. Series, 1996, pp. 21–30.
"Light Field Rendering" by Levoy & Hanrahan in SIGGRAPH Computer Graphics Proceedings, Annual Conf. Series, 1996, pp. 31–42.
The Lumigraph by Gortler et al., SIGGRAPH Computer Graphics Proceedings, Annual Conf. Series, 1996, pp. 43–54.
"An Anti–Aliasing Technique for Splatting" by Swan et al., by Swan et al., Proceedings IEEE Visualization 1997, pp. 197–204.
"Multiple–Centre–of–Projection Images" by Rademacher & Bishop in SIGGRAPH Computer Graphics Proceedings, Annual Conference Series, 1998, pp. 199–206.
"View–base Rendering: Visualizing Real Objects from Scanned Range & Color Data" by Pulli et al., Proceedings Eurographics 8th Workshop on Rendering, Jun. 1997, pp. 23–34.
"Construction Virtual World Using Dense Stero" by Narayanan & Kanade, Proceedings 6th ICCV, 1998, pp. 3–10.

\* cited by examiner

*Primary Examiner*—Joseph Mancuso
*Assistant Examiner*—Adam Arnold
(74) *Attorney, Agent, or Firm*—Fitzpatrick, Cella, Harper & Scinto

(57) ABSTRACT

An image-based rendering method for processing depth map images of a scene recorded from different viewpoints, and generating a virtual image of the scene from an arbitrary viewpoint. To calculate the color value of a pixel in the virtual image, a pixel-viewing ray is defined from the focal point of the virtual camera through the pixel. The ray is projected into each depth map image, giving a projected ray. Pixels in a depth map image which are intersected by the projected ray are tested by defining a point ($W_1$, $W_2$, $W_3$) along a line from the focal point of the depth map camera through the pixel at a distance corresponding to the depth of the pixel. A color value for the pixel in the virtual image is calculated by interpolating between the values of the pixels in the depth map image which produced the points ($W_2$, $W_3$) lying on opposite sides of the pixel viewing ray.

60 Claims, 34 Drawing Sheets

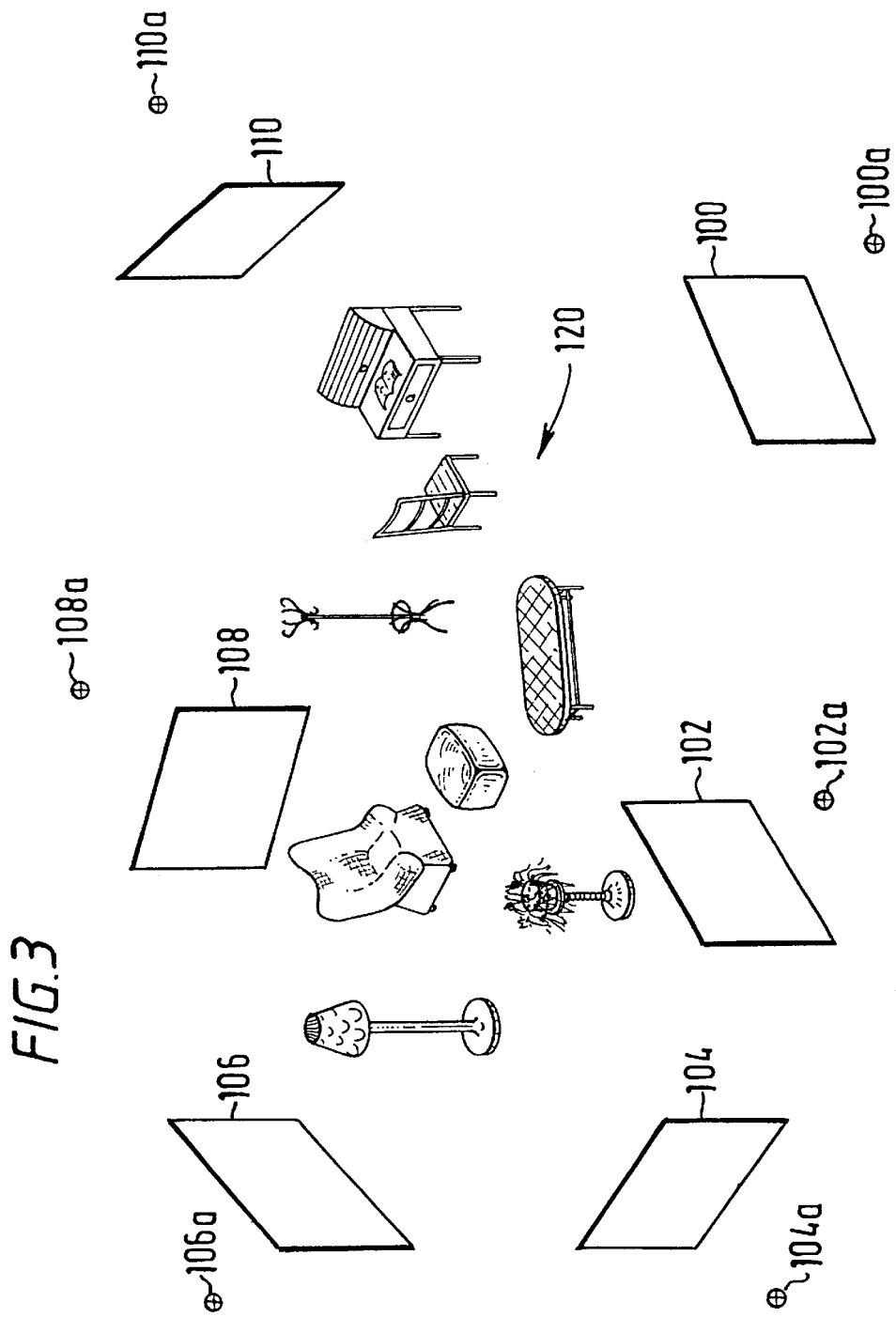

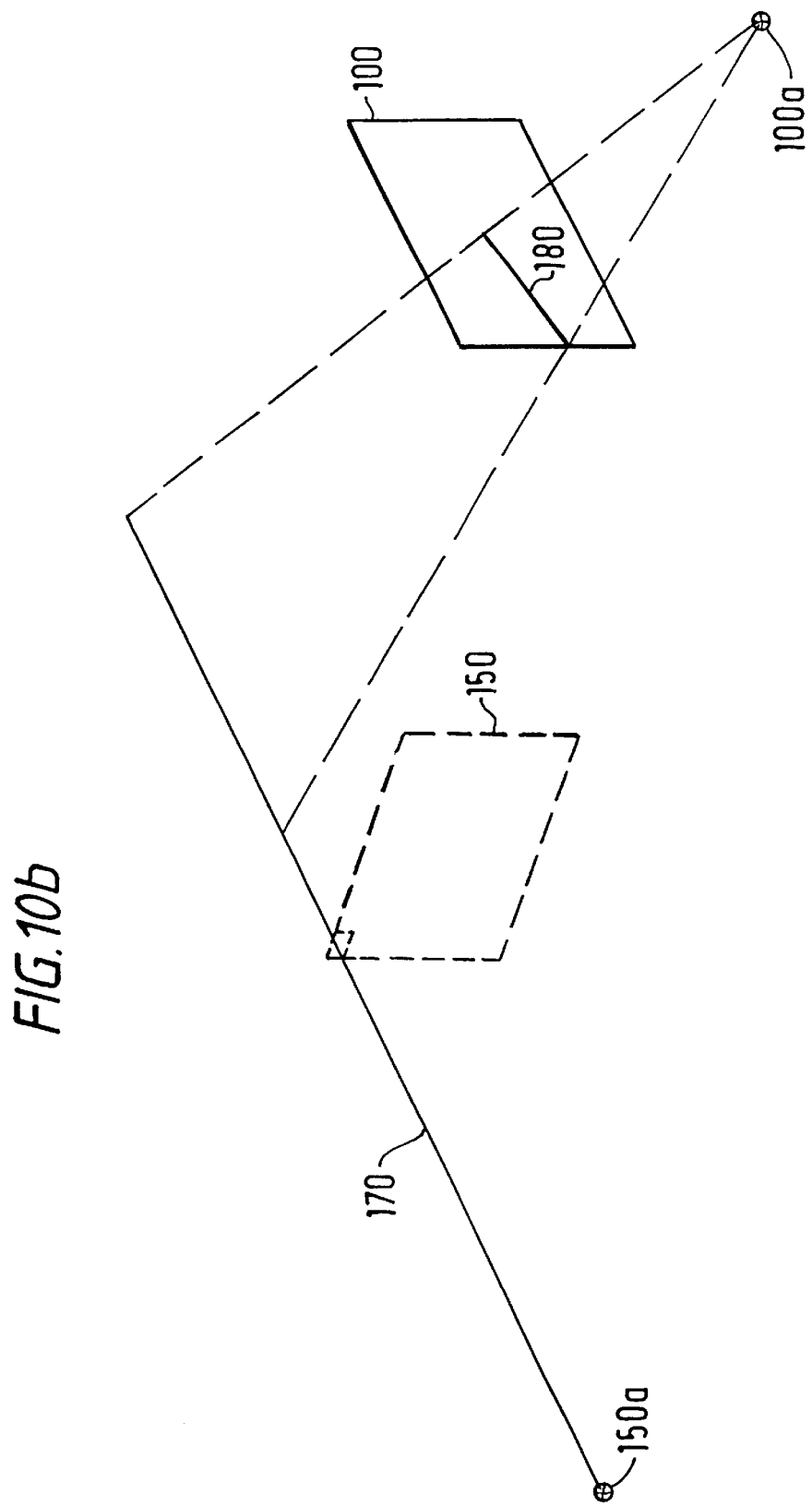

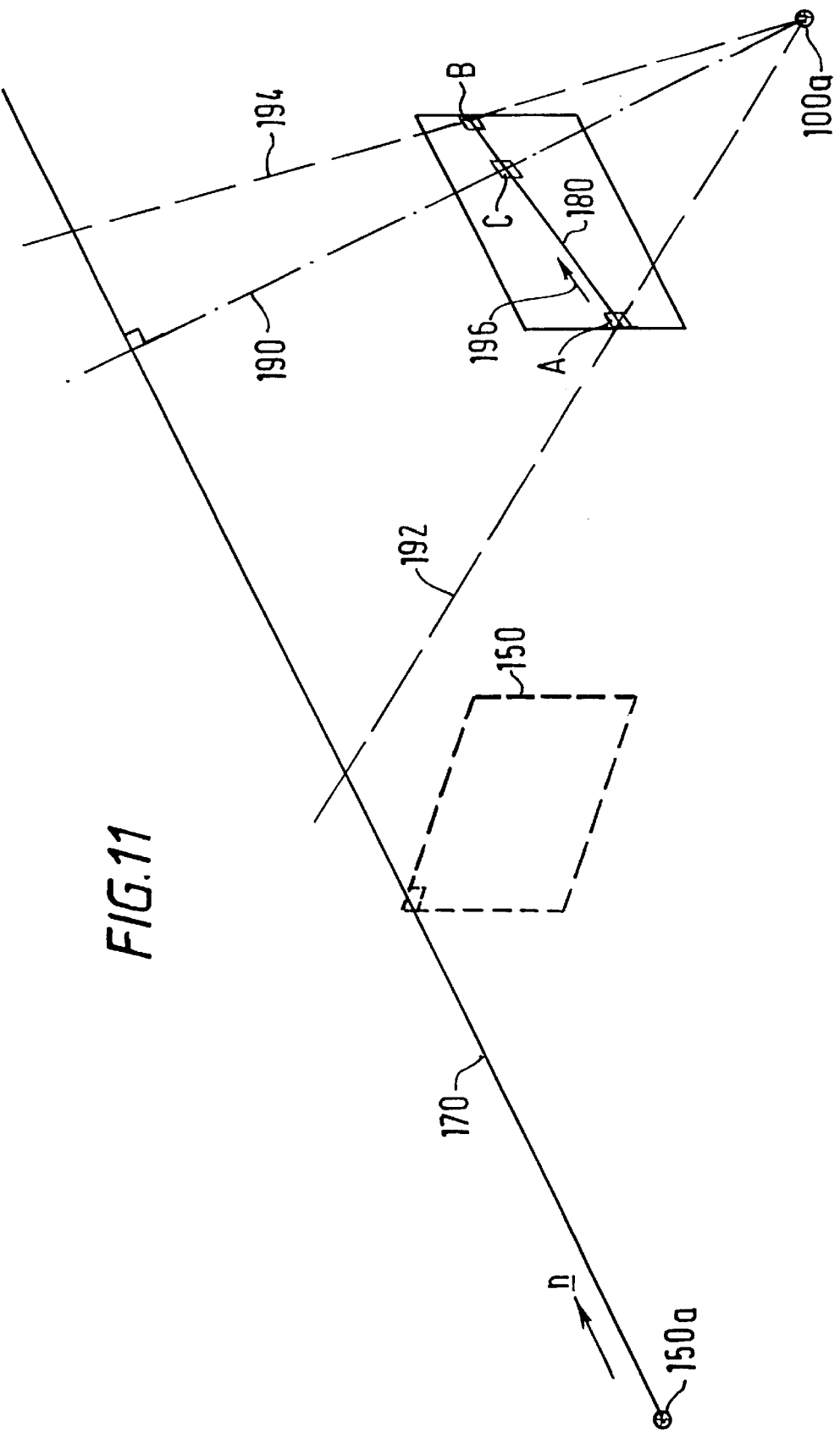

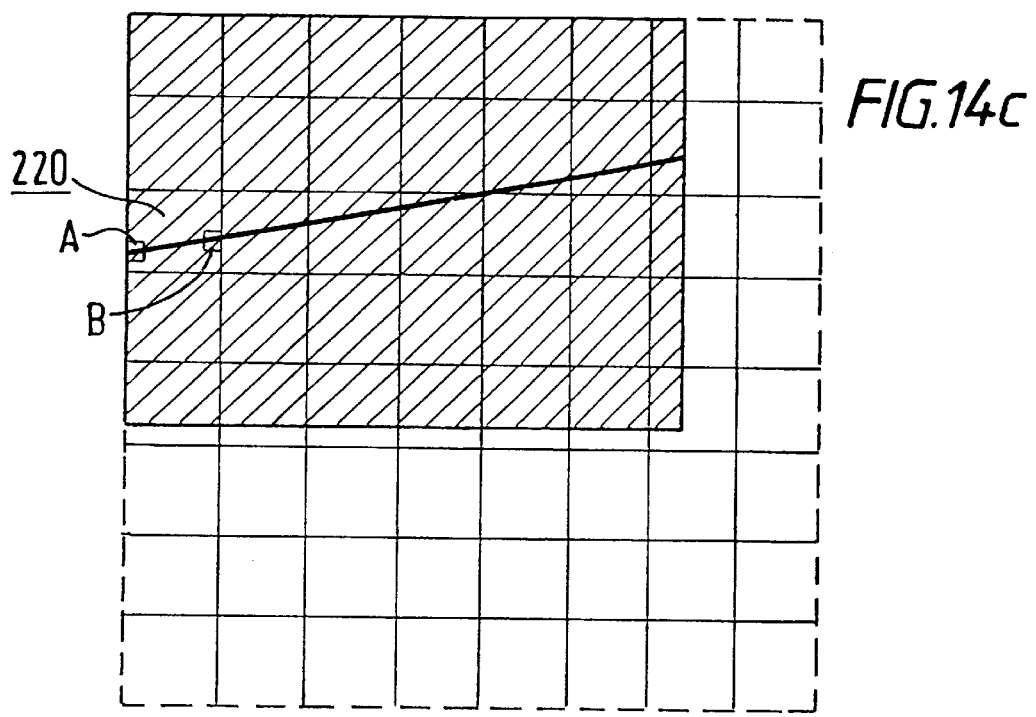

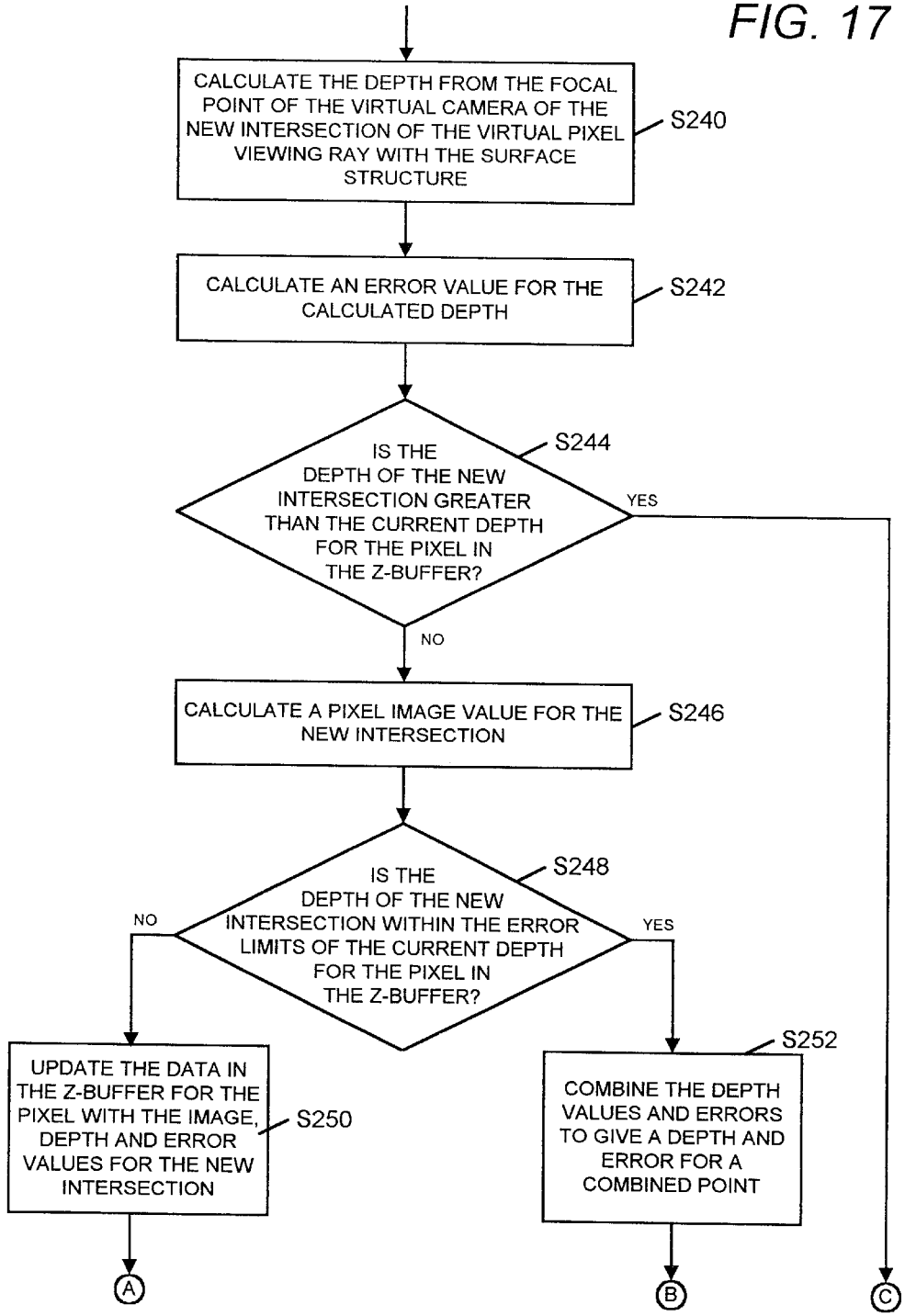

IMAGE PROCESSING APPARATUS

The present invention relates to the field of image-based rendering, that is the processing of data defining pre-acquired images (real or synthetic, static or dynamic) to synthesise a new image from a desired viewpoint without relying upon a geometric model of the subject.

Images such as photographs, television pictures, video pictures etc provide a two-dimensional view of a scene from only predetermined viewpoints determined by the positions of the cameras. However, it is often desirable to view the scene from a different viewing position/orientation, and accordingly a number of techniques have been developed for this.

In one approach, known as "model-based rendering" a geometric model of the subject is created using geometric primitives such as polygons, and the model is then rendered from a desired viewing position and orientation taking into account reflectance properties of the surface of the subject and parameters defining the position and characteristics of light sources.

Such an approach suffers from many problems, however, and in particular the time and processing resources necessary to define the geometric model, surface reflectances and light sources sufficiently well that a realistic output image can be achieved.

As a result, a number of "image-based rendering" techniques have been developed which can generate an image from a viewing position/orientation different to those of the start images without using a geometric model of the subject.

For example, techniques based on interpolating the positions and colours of pixels in two images have been proposed to generate intermediate views, such as in "View Morphing" by Seitz and Dyer in SIGGRAPH Computer Graphics Proceedings, Annual Conference Series, 1996, pages 21–30. However, the intermediate views are only generated for a viewpoint on the line connecting the two viewpoints of the original images.

An image-based rendering technique which allows an image to be generated from an arbitrary viewing position/ orientation is disclosed in "Light Field Rendering" by Levoy and Hanrahan in SIGGRAPH Computer Graphics Proceedings, Annual Conference Series, 1996, pages 31–42, in which a four-dimensional light field defining radiance as a function of position and direction is generated. This function characterises the flow of light through unobstructed space in a static scene with fixed illumination. Generating a new image is done by calculating a slice of the light field in two-dimensions. However, the number of input images required and the time and processing resources necessary to perform this technique are considerable.

"The Lumigraph" by Gortler et al in SIGGRAPH Computer Graphics Proceedings, Annual Conference Series, 1996, pages 43–54 discloses a technique in which a simplified light field function is calculated by considering only light rays leaving points on a convex surface that encloses the object. In this technique, however, images can be synthesised only from viewpoints exterior to the convex hull of the object being modelled, and the number of input images required and the processing time and effort is still very high.

A further image-based rendering technique is described in "Multiple-Centre-of-Projection Images" by Rademacher and Bishop in SIGGRAPH Computer Graphics Proceedings, Annual Conference Series, 1998, pages 199–206. In this technique a multiple-centre-of-projection image of a scene is acquired, that is, a single two-dimensional image and a parameterised set of cameras meeting the conditions that (1) the cameras must lie on either a continuous curve or a continuous surface, (2) each pixel is acquired by a single camera, (3) viewing rays vary continuously across neighbouring pixels, and (4) two neighbouring pixels must either correspond to the same camera or to neighbouring cameras. In practice, the required multiple-centre-of-projection image is acquired by translating a one-dimensional CCD camera along a path so that one-dimensional image-strips are captured at discrete points on the path and concatenated into the image buffer. However, the scene must be static to prevent mismatched data as every image-strip is captured at a different time. To render an image of the scene from a new viewpoint, the reprojected location in world-space of each pixel from the multiple-centre-of-projection image is computed, and the reprojected points are then rendered to reconstruct a conventional range image from the new viewpoint. To perform the rendering, a splatting technique is proposed, which consists of directly rendering each point using a variable-size reconstruction kernel (e.g. a Gaussian blob), for example as described in "An Anti-Aliasing Technique for Splatting" by Swan et al in Proceedings IEEE Visualization 1997, pages 197–204. This technique suffers, inter alia, from the problem that a multiple-centre-of-projection image is required as input.

A number of hybrid approaches, which combine model-based rendering and image-based rendering, have been proposed.

For example, "View-based Rendering: Visualizing Real Objects from Scanned Range and Color Data" by Pulli et al in Proceedings Eurographics 8th Workshop on Rendering, June 1997, pages 23–34, discloses a technique in which a partial geometric model comprising a triangle mesh is interactively created for each input image which originates from a different viewpoint. To synthesize an image from a new viewpoint, the partial models generated from input images at three viewpoints close to the new viewpoint are rendered separately and combined using a pixel-based weighting algorithm to give the synthesised image.

"Constructing Virtual Worlds Using Dense Stereo" by Narayanan and Kanade in Proceedings 6th ICCV, 1998, pages 3–10, discloses a hybrid technique in which the intensity image and depth map for each camera view at each instant in time is processed to generate a respective textured polygon model for each camera, representing the scene visible to that camera. To generate an image for a user-given viewpoint, the polygon model which was generated from the camera closest to the user viewpoint (a so-called "reference" camera) is rendered and holes in the resulting rendered view are filled by rendering the polygon models which were generated from two camera neighbouring the reference camera. If any holes still remain, they are filled by interpolating pixel values from nearby filled pixels. Alternatively, a global polygon model of the whole scene can be constructed and rendered from the desired viewpoint.

In both of the hybrid techniques described above, a large number of closely-spaced cameras is required to provide the input data unless the viewpoints from which a new image can be generated are severely restricted and/or a degraded quality of generated image is accepted. This is because a partial geometric model must be available from each of a number of cameras that are close to the viewpoint from which the new image is to be rendered. For example, in the technique described in "Constructing Virtual Worlds Using Dense Stereo", 51 cameras are mounted on a 5 meter geodesic dome to record a subject within the dome. In addition, processing time and resource requirements are increased due to the requirement to generate at least partial geometric models.

The present invention has been made with the above problems in mind.

According to the present invention, there is provided an image-based rendering method or apparatus, in which, to generate a value for a pixel in a virtual image from a user-defined viewpoint, input depth map images are tested to identify the pixel or pixels therein which represent the part of the scene potentially visible to the pixel in the virtual image, and a value for the pixel in the virtual image is calculated based on the pixel(s) which represent the part of the scene closest to the virtual image.

Preferably, a Z-buffer is used to maintain pixel values for the virtual image, which is updated as the input depth map images are tested if the pixel or pixels identified from a depth map image represent a part of the scene closer to the virtual image than the part represented by the value for the virtual pixel already stored in the Z-buffer.

The invention also provides an image-based rendering method or apparatus for processing depth map images to generate pixel values for an image from a different viewpoint, in which a pixel value is calculated by defining a viewing ray through the pixel, and testing the depth map images using the viewing ray to identify the pixel or pixels in the depth map images which represent the part of the scene which can actually be seen by the pixel, and by calculating a value for the pixel in dependence upon the identified pixel or pixels.

Embodiments of the invention will now be described, by way of example only, with reference to the accompanying drawings, in which:

FIG. 1 schematically shows the components of an embodiment of the invention, together with the notional functional processing units into which the processing component may become configured when programmed by processing instructions;

FIG. 2 shows the pre-processing operations performed on input data by the apparatus shown in FIG. 1;

FIG. 3 schematically illustrates the positions and orientations defined in the input data of input depth map images relative to a scene;

FIGS. 4a, 4b, 4c, 4d and 4e schematically illustrate the sub-division of a depth map image which is carried out at step S16 in FIG. 2;.

FIG. 5 shows the processing operations performed by the apparatus in FIG. 1 to generate a virtual image in accordance with user-defined viewing parameters;

FIG. 6 schematically illustrates the user-defined position and orientation of the virtual image relative to the scene recorded in the input depth map images;

FIGS. 10a and 10b illustrate the definition of a virtual pixel viewing ray at step S100 in FIG. 9, and the projection of the virtual pixel viewing ray into a depth map image at step S104 in FIG. 9;

FIG. 11 illustrates the definition of a line perpendicular to the virtual pixel viewing ray to the focal point of the depth map image camera at step S106 in FIG. 9 and the determination of the pixel of intersection of the line with the depth map image at step S110 in FIG. 9;

FIGS. 14a, 14b and 14c illustrate the different levels of sub-division of a depth map image and the segments therein which are considered at steps S150 and S152 in FIG. 13;

Figure 13:
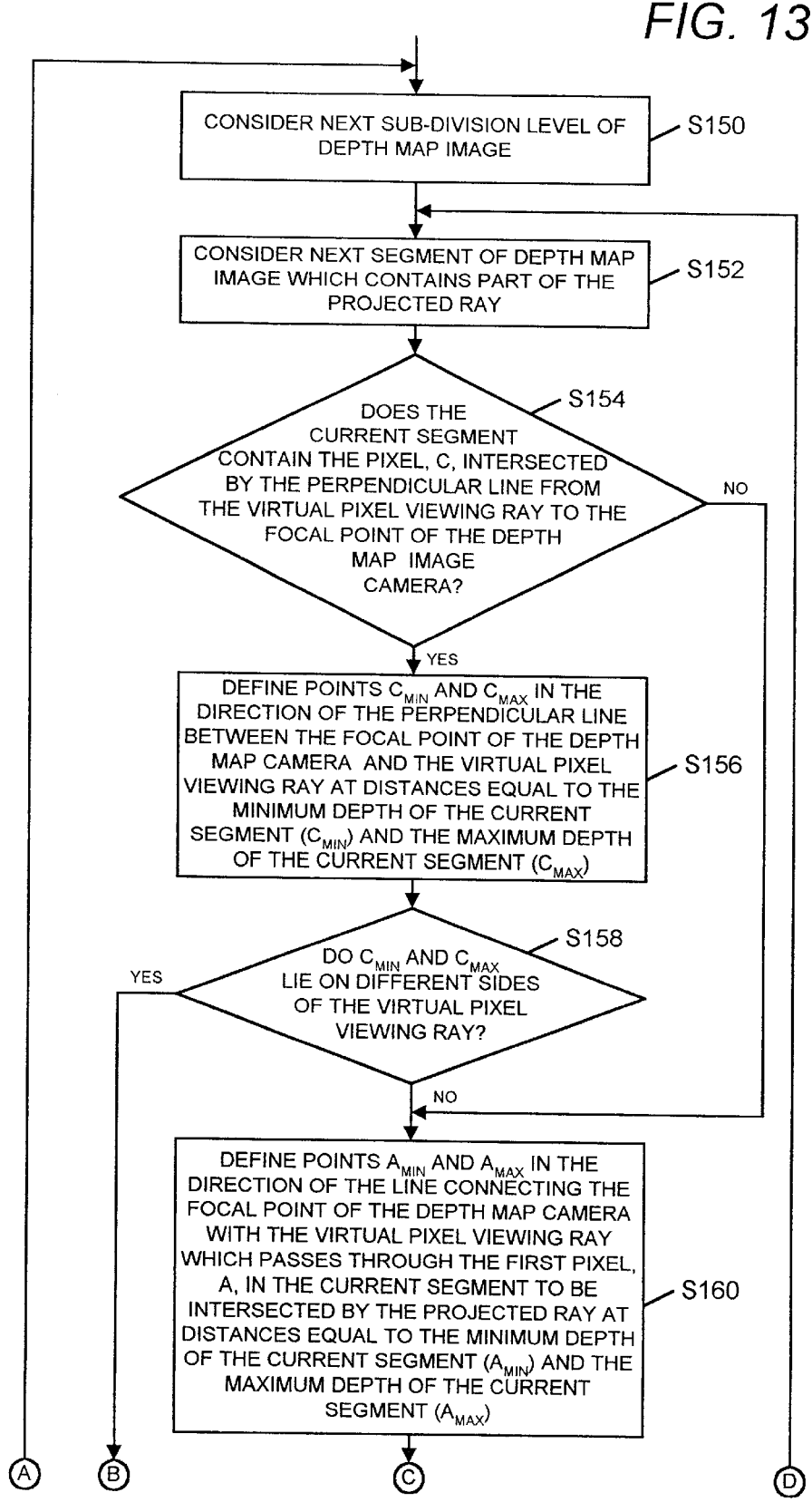
FIG. 13 shows the processing operations performed at step S124 in FIG. 9.
Figure 13:
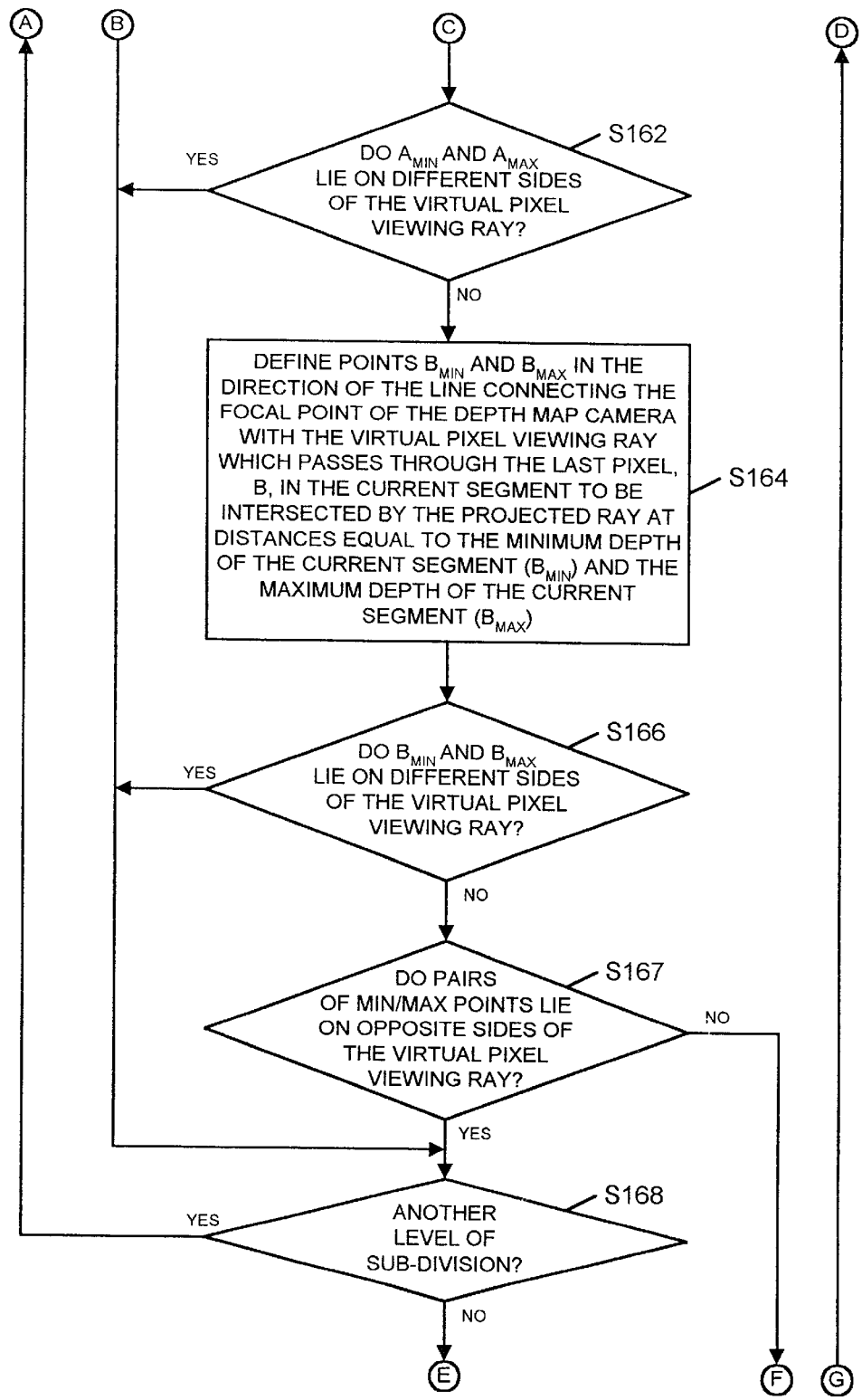
Figure 13:
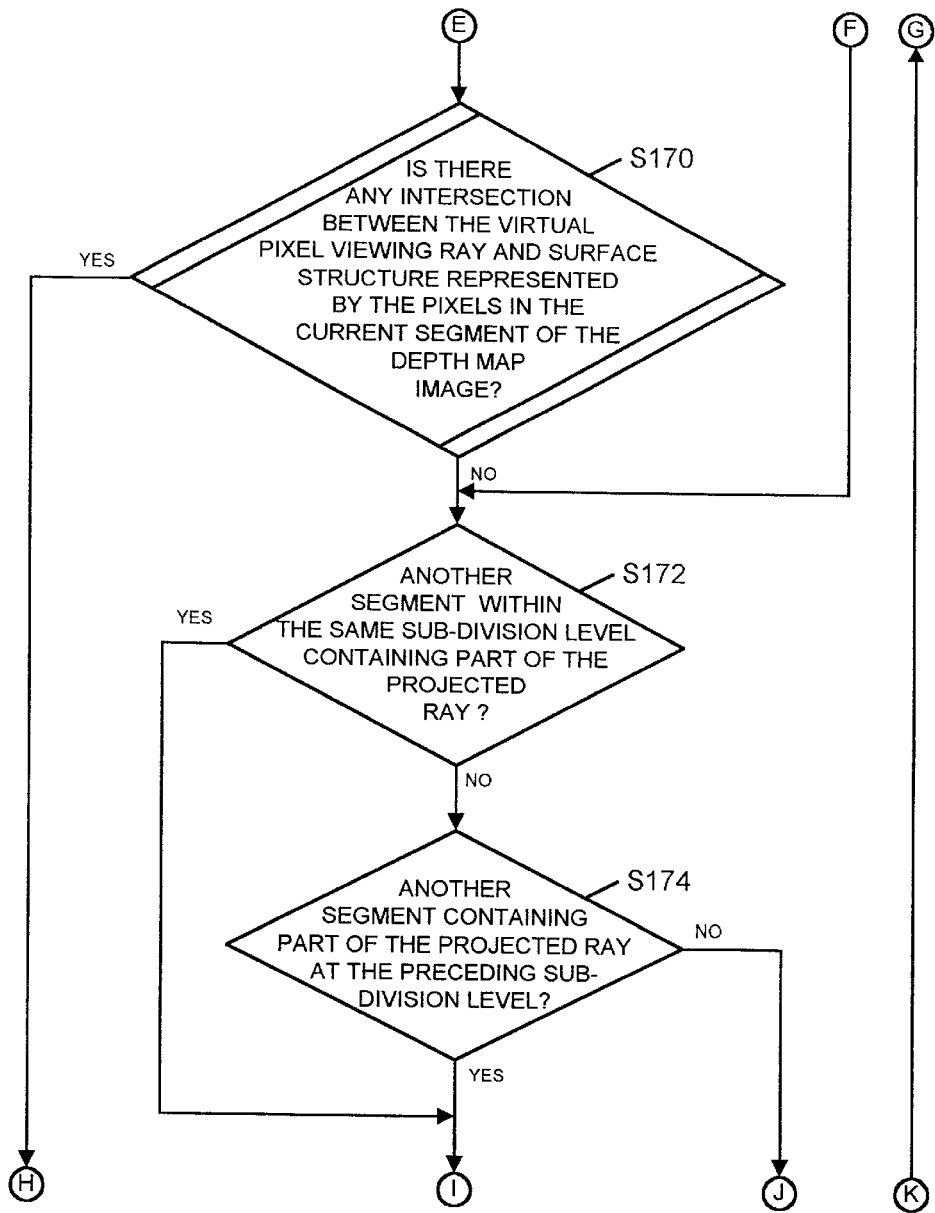
Figure 13:
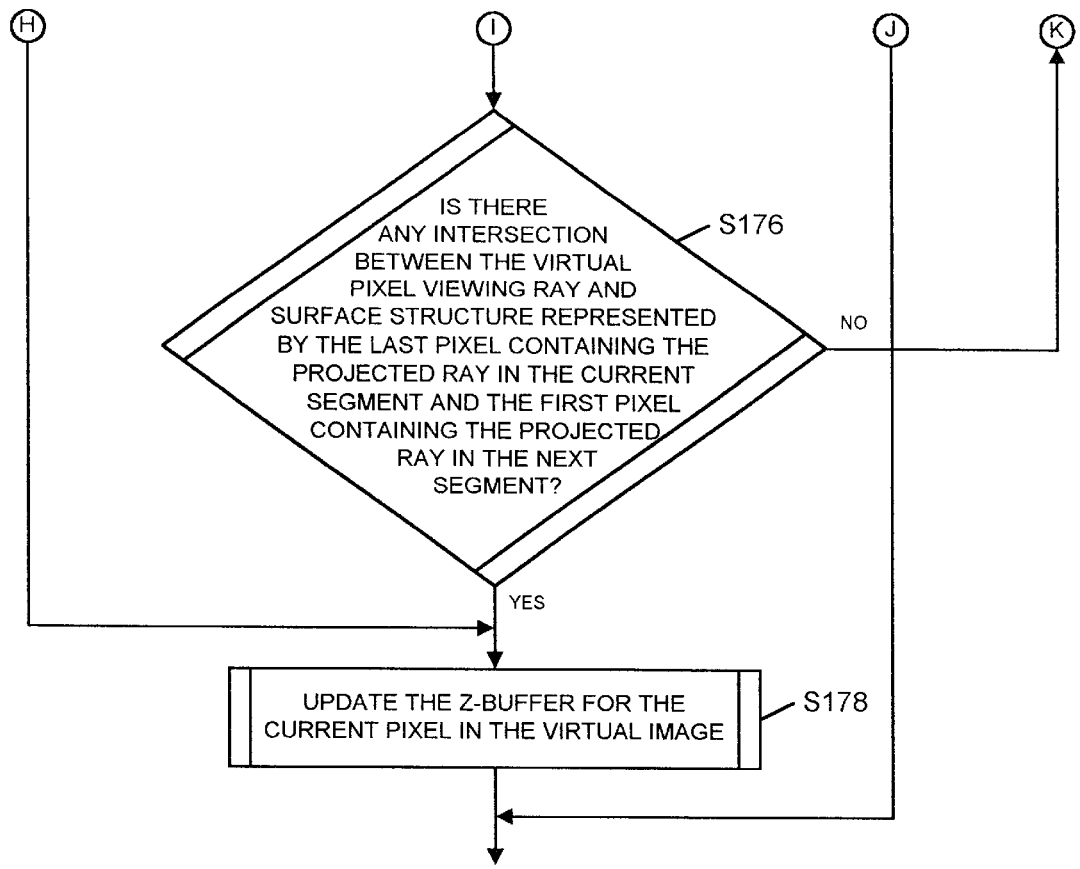
Figure 15:
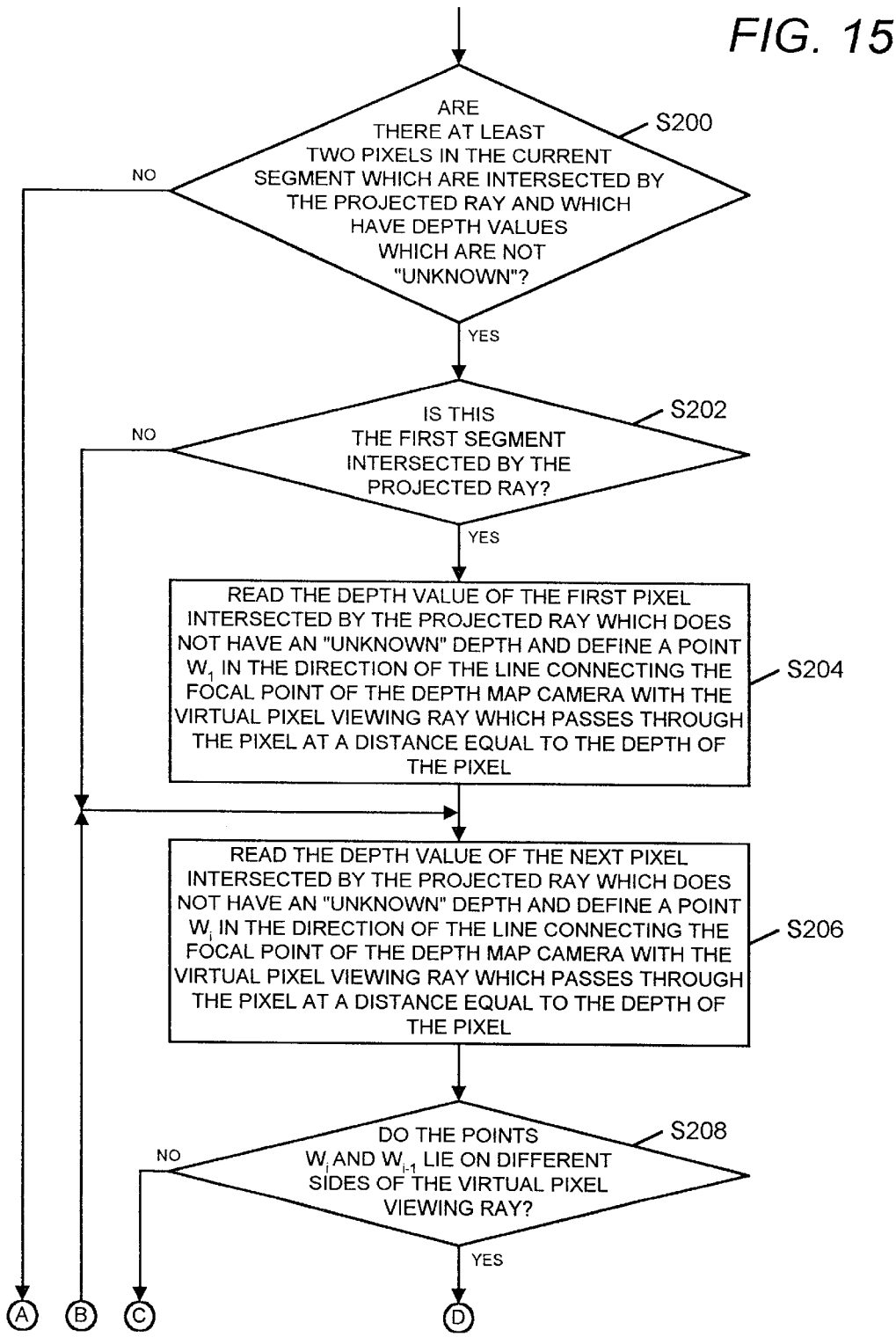
FIG. 15 shows the processing operations performed at step S170 in FIG. 13.
Figure 15:
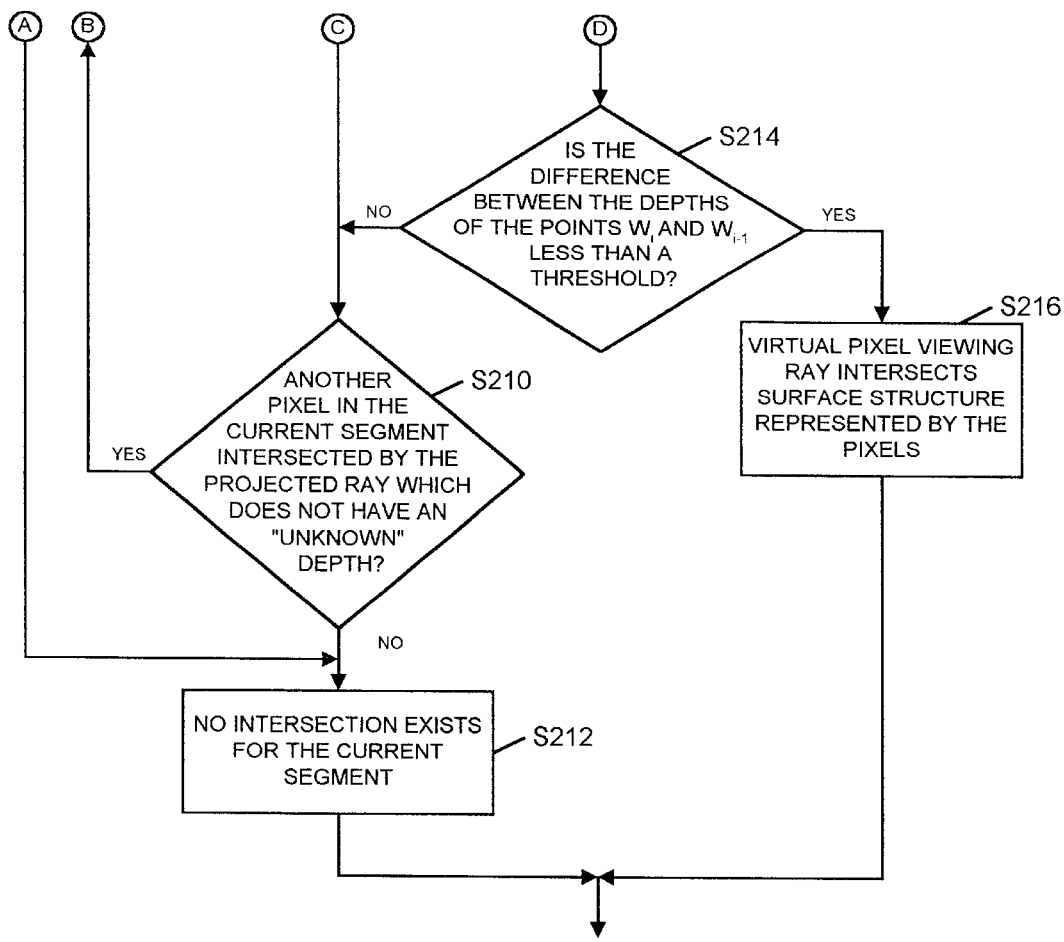
Figure 16:
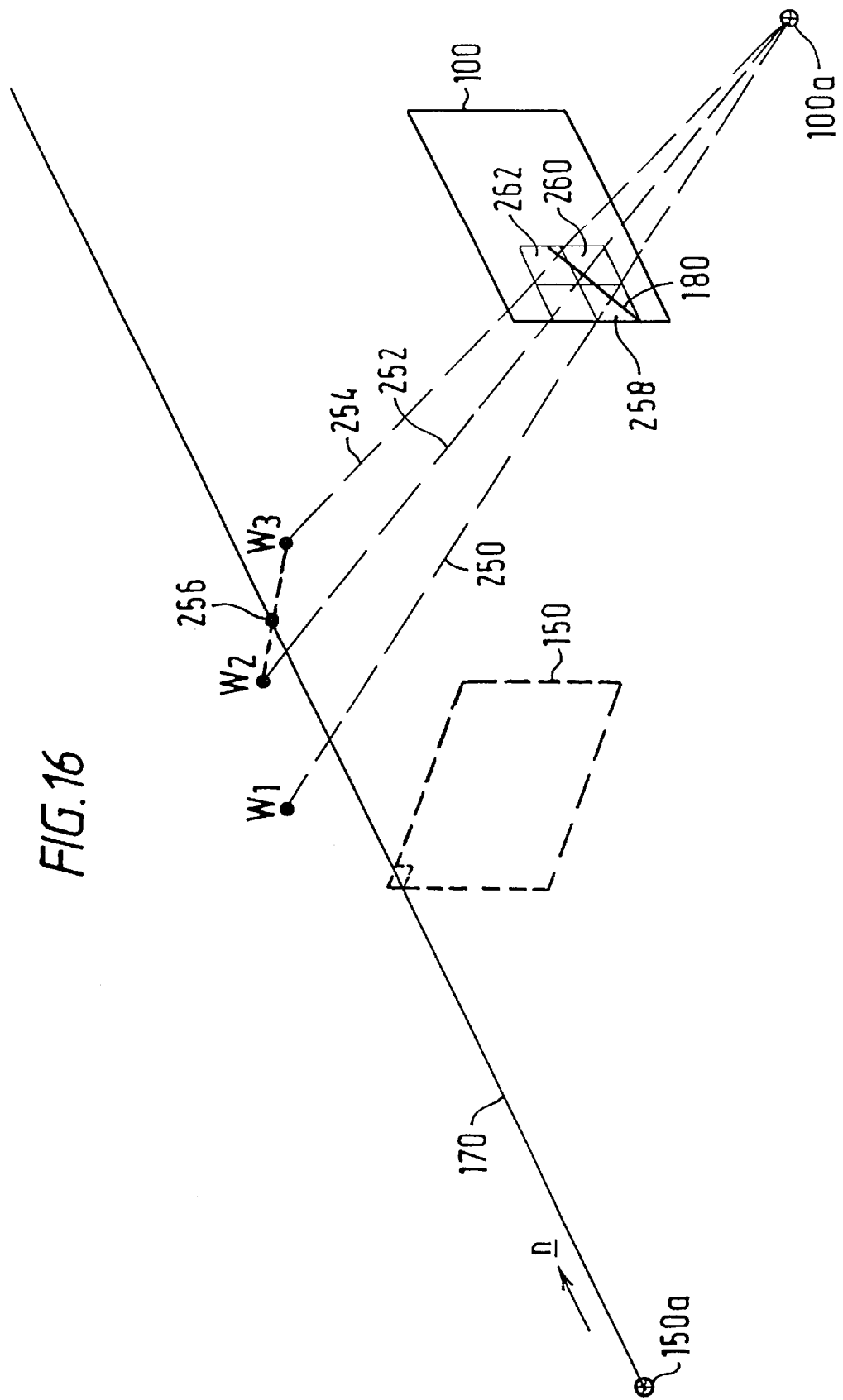
Figure 17:
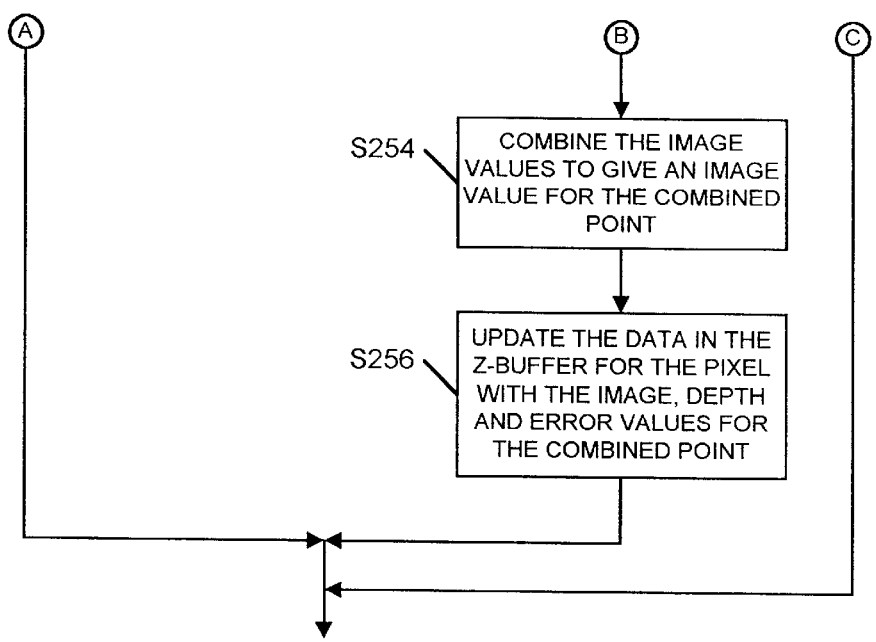
Figure 18A:
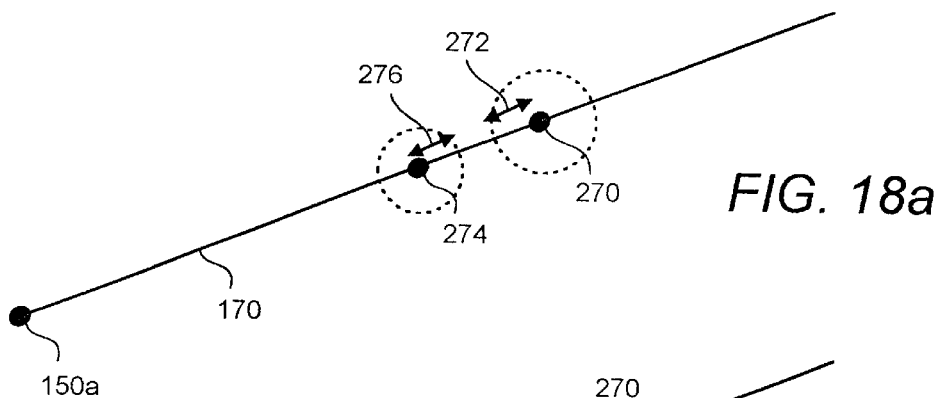
Figure 18B:
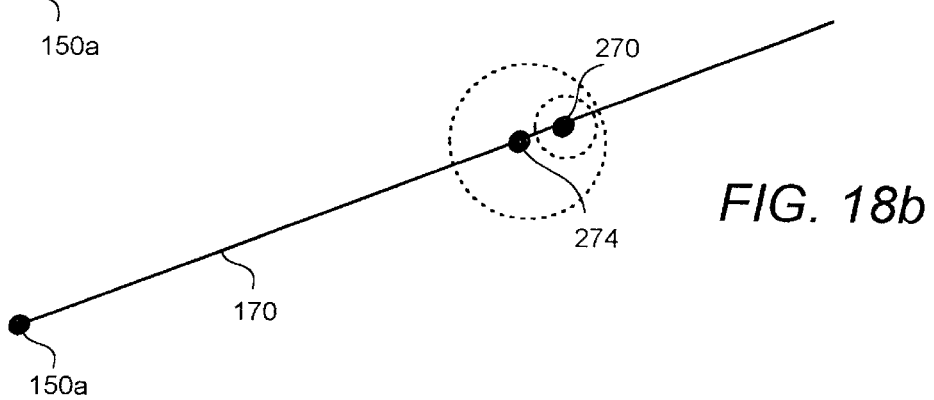
Figure 18C:
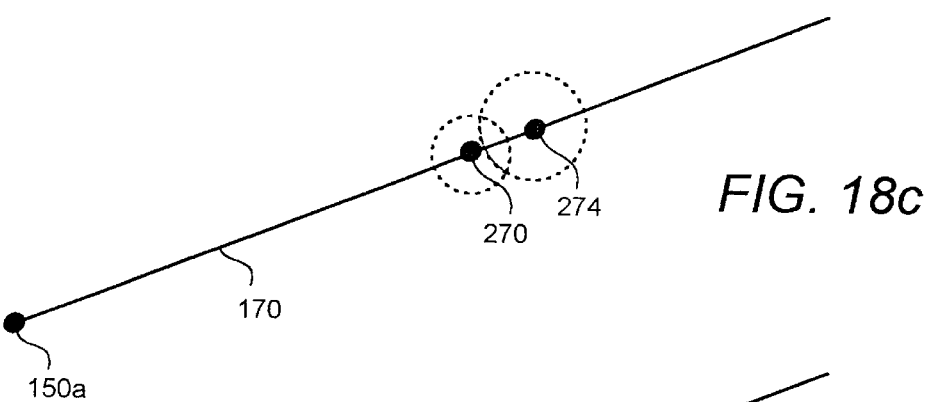
Figure 18D:
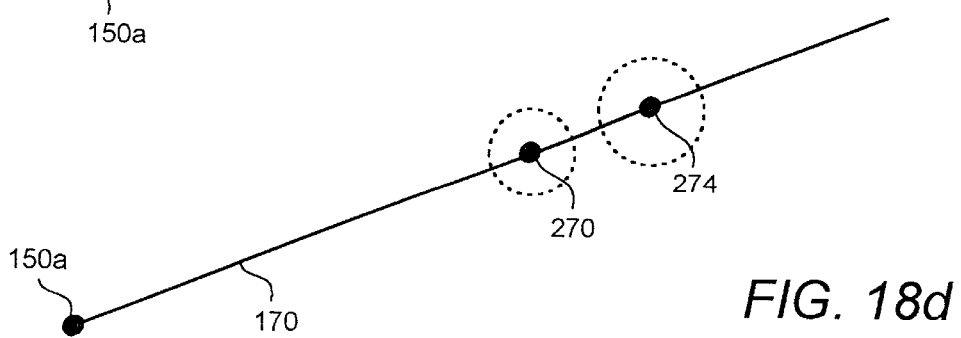
Figure 19:
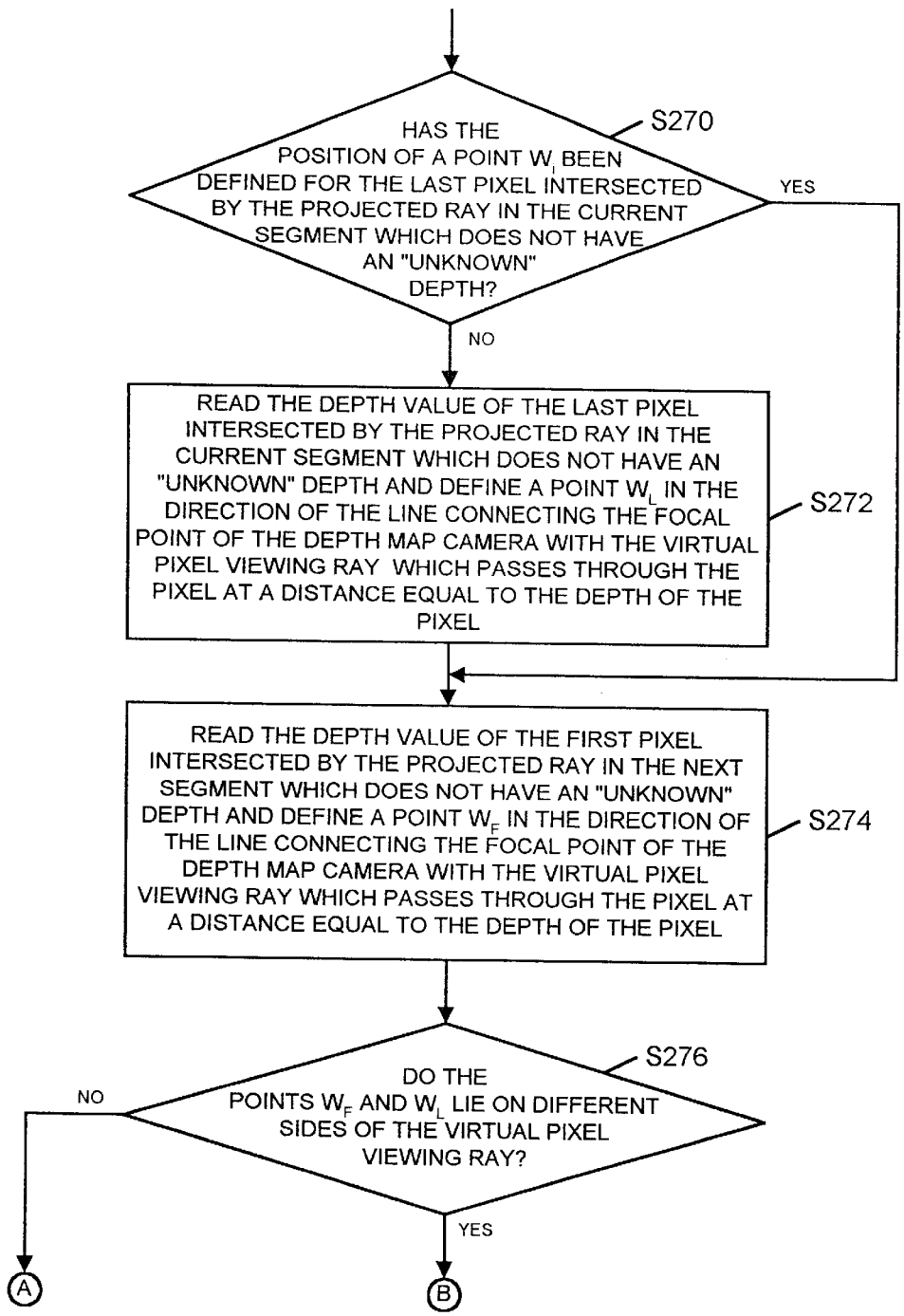
Figure 19:
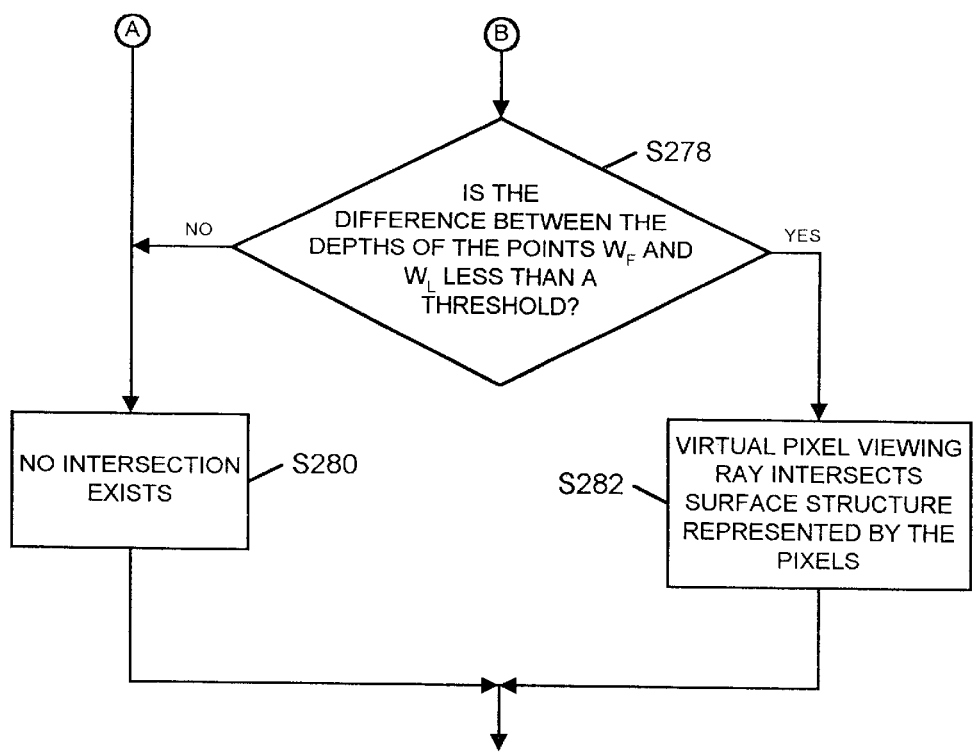

FIG. 16 schematically illustrates the processing operations performed at steps S204 to S210 in FIG. 15;

FIG. 17 shows the processing operations performed at step S178 in FIG. 13;

FIGS. 18a, 18b, 18c and 18d schematically illustrate the tests performed at step S244 and S248 in FIG. 17; and FIG. 19 shows the processing operations performed at step S176 in FIG. 13.

Figure 1:
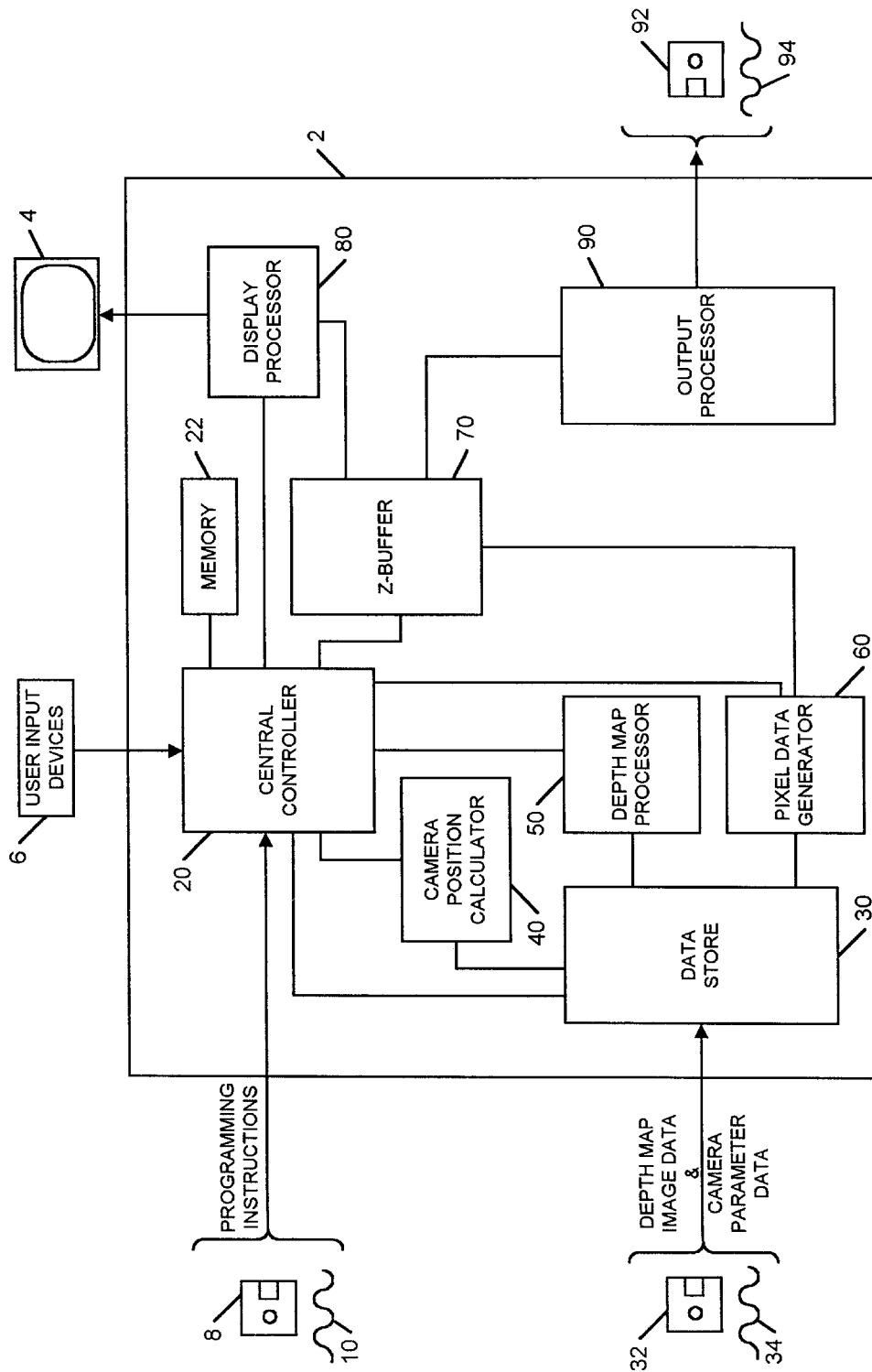

Referring to FIG. 1, an embodiment of the invention comprises a processing apparatus 2, such as a personal computer containing, in a conventional manner, one or more processors, memory, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium, such as disk 8, and/or as a signal 10 input to the processing apparatus, for example from a remote database, by transmission over a communication network (not shown) such as the internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of depth map images of a scene recorded with different viewing positions and/or viewing orientations, and data defining parameters of the camera or cameras used to record the image data for the depth map images (referred to as a "depth map camera"). Each depth map image comprises, in a conventional manner, an image value for each pixel in the image defining the colour or intensity (greyness) of the part of the scene represented by the pixel and a depth value defining the distance of the part of the scene represented in the pixel from the camera which recorded the image. The processing apparatus 2 is operable to process the input data to generate data for an output image from any user-selected viewing position and/or orientation, and to add an object to appear in the output image and/or to remove an object so that it does not appear in the output image.

When programmed by the programming instructions, processing apparatus 2 effectively becomes configured into a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent the exact units and connections into which the processor, memory etc of the processing apparatus 2 become configured.

Referring to the functional units shown in FIG. 1, a central controller 20 processes inputs from the user input devices 6, and also provides control and processing for a number of the other functional units. Memory 22 is provided for use by central controller 20 and the other functional units.

Data store 30 stores input data input to the processing apparatus 2 as data stored on a storage device, such as a disk 32, or as a signal 34 transmitted to the processing apparatus 2. The input data defines a plurality of depth map images, together with the intrinsic camera parameters (aspect ratio, focal length, principal point, and first order radial distortion coefficient) for each depth map camera, and, optionally, the viewing position and orientation of each depth map camera.

Camera position calculator 40 processes the input data if the position and orientation of each depth map camera is not defined in order to calculate these positions and orientations.

Depth map processor 50 pre-processes the input data to generate data for use in calculating the pixel data of a depth map image in accordance with user-selected parameters of a depth map camera (including viewing position and orientation, and focal length).

Pixel data generator 60 calculates an image value and a depth value for each pixel in the output depth map image, and stores these values in a conventional Z-buffer 70.

Display processor 80, under control of central controller 20, displays images and instructions to a user via display device 4.

Output processor 90 outputs data from Z-buffer 70 defining the image values of the pixels in the generated depth map image and, optionally, the depth values of each pixel as well. This data is output for example on a storage device, such as a disk 92, or as a signal 94.

Figure 2:
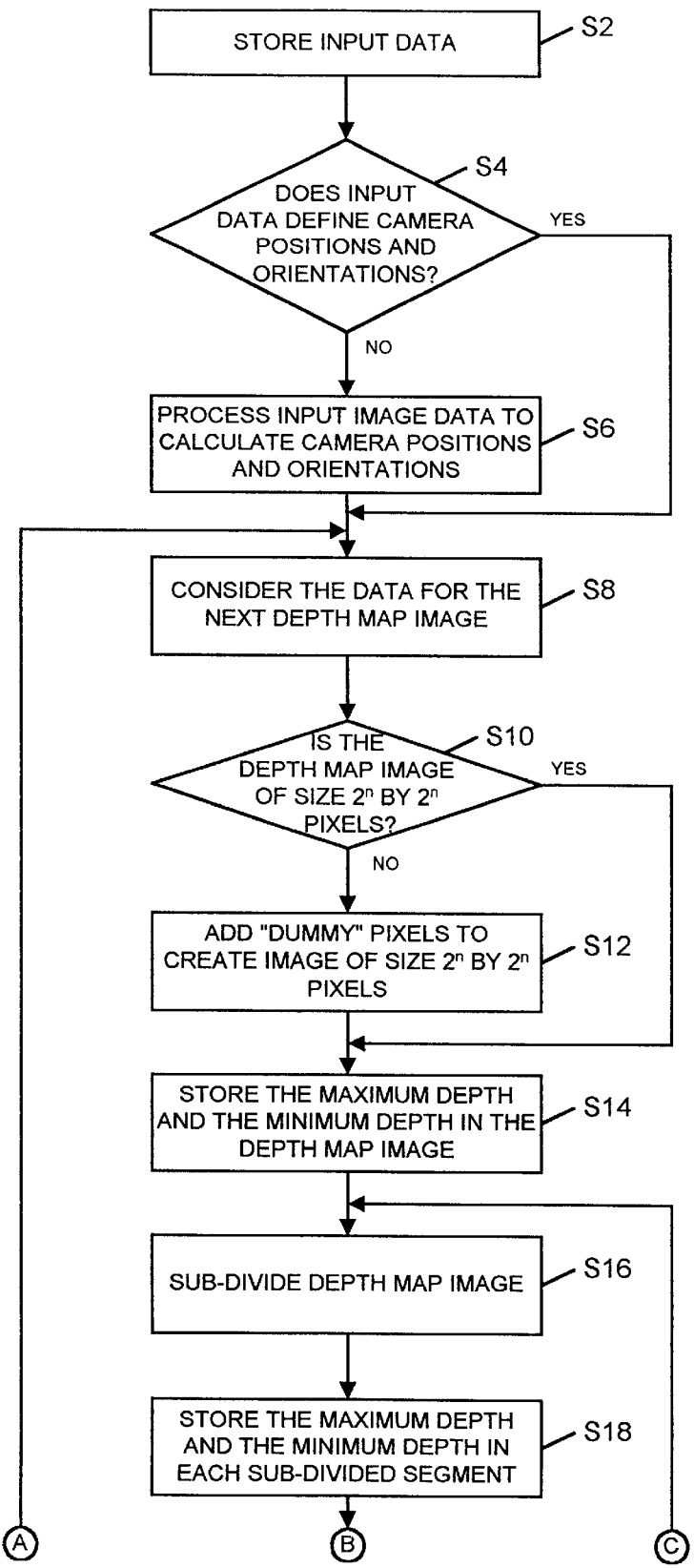
Figure 2:
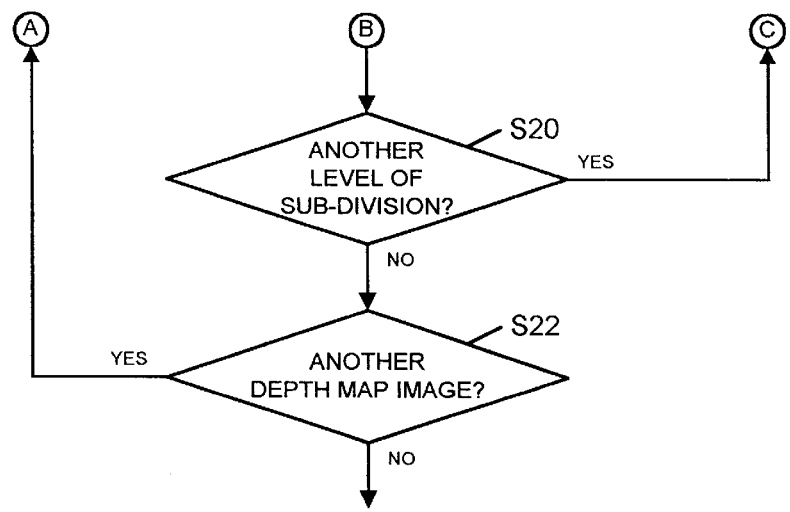

FIG. 2 shows the pre-processing operations performed by processing apparatus 2 prior to the input by the user. of data defining the output depth map image that is to be generated.

Referring to FIG. 2, at step S2, depth map image data and camera parameter data input to the processing apparatus 2, for example on disk 32 or as signal 34, is stored in the data store 30.

Referring to FIG. 3, in which an example scene is shown (in this case, objects in a room) the input data defines a plurality of depth map images 100, 102, 104, 106, 108, 110 of one or more objects 120. Each depth map image comprises a plurality of pixels in a conventional manner and the input data defines an image (colour or grey) value for each pixel and a depth value for each pixel defining the distance of the object surface, background etc. represented in the pixel from the focal point of the camera used to record the image data (the depth map camera). Each image value may, of course, comprise a plurality of values to define a pixel colour, for example a value for each of red, green and blue components. The input data further defines the intrinsic parameters of the depth map cameras, including the focal point 100a, 102a, 104a, 106a, 108a, 110a of each depth map camera. Optionally, the input data stored at step S2 may also define the position and orientation of each depth map camera.

Referring again to FIG. 2, at step S4, central controller 20 reads the data stored in data store 30 and determines whether the input data defines the position and orientation of each depth map camera.

If it is determined at step S4 that the input data does not define the position and orientation of each depth map camera, then, at step S6, camera position calculator 40 calculates the positions and orientations. More particularly, the positions and orientations are calculated by identifying matching features in the depth map images and then calculating the positions and orientations using the matched features. Such processing may be carried out in a number of conventional ways, or as described in EP-A-0898245.

On the other hand, if it is determined at step S4 that the input data already defines the positions and orientations of the depth map cameras, then step S6 is omitted.

At step S8, central controller 20 and depth map processor 50 consider the data for the next depth map image stored in data store 30 (this being the data for the first depth map image the first time step S8 is performed).

At step S10, the data for the depth map image is read to determine if the depth map image is of a size $2^n$ by $2^n$ pixels, that is, whether the image has the same number of pixels in the height and width directions and whether the number of pixels in each of these directions has a value $2^n$ where n is an integer (that is, the number of pixels is 2, 4, 8, 16 . . . ).

If it is determined at step S10 that the depth map image being considered is not of size $2^n$ by $2^n$ pixels, then, at step S12, depth map processor 50 adds "dummy" pixels to the depth map image, that is, pixels having no depth or image values, to create an image of size $2^n$ by $2^n$ pixels.

Figure 4A:
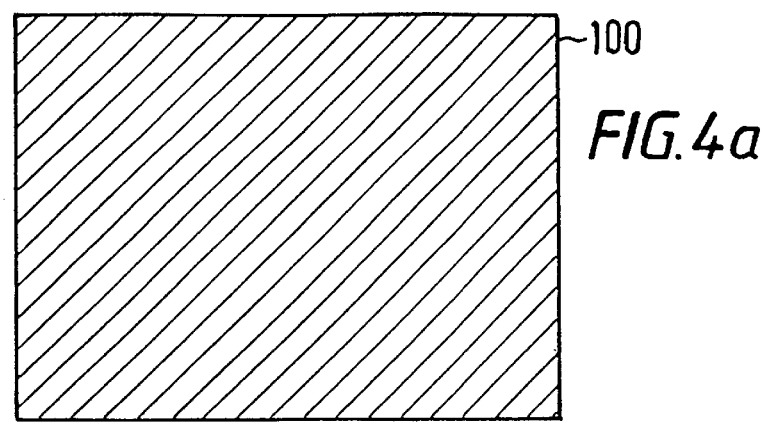
Figure 4B:
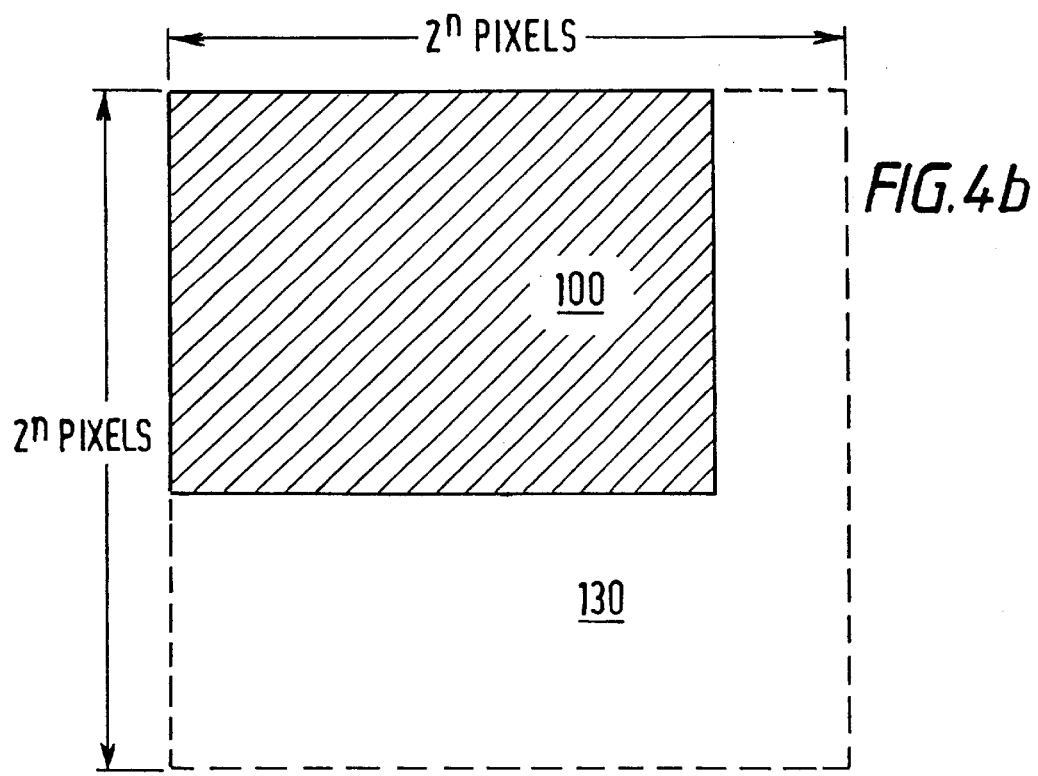

More particularly, referring to the example shown in FIGS. 4a and 4b, the depth map image 100 represents an input depth map image having more pixels in the width direction than the height direction and the number of pixels in both directions is not $2^n$. Accordingly, at step S12, depth map processor 50 adds dummy pixels, schematically shown as region 130 in FIG. 4b, to increase the number of pixels in the width direction to the first number which has a value $2^n$ and to increase the number of pixels in the depth direction to the same number as in the increased width direction. Accordingly, as a result of the processing performed at step S12, the depth map image being processed has a size of $2^n$ by $2^n$ pixels comprising the pixels in the original input depth map image 100 and dummy pixels 130.

On the other hand, if it is determined at step S10 that the input depth map image is already of size $2^n$ by $2^n$ pixels, then step S12 is omitted.

At step S14, depth map processor 50 reads the depth values of the pixels in the depth map image and stores the maximum depth value and the minimum depth value. These values correspond to the maximum depth and minimum depth in the input depth map image 100 since, as noted above, the dummy pixels 130 added at step S12 do not have associated depth or image values.

At step S16, depth map processor 50 sub-divides the depth map image.

Figure 4C:
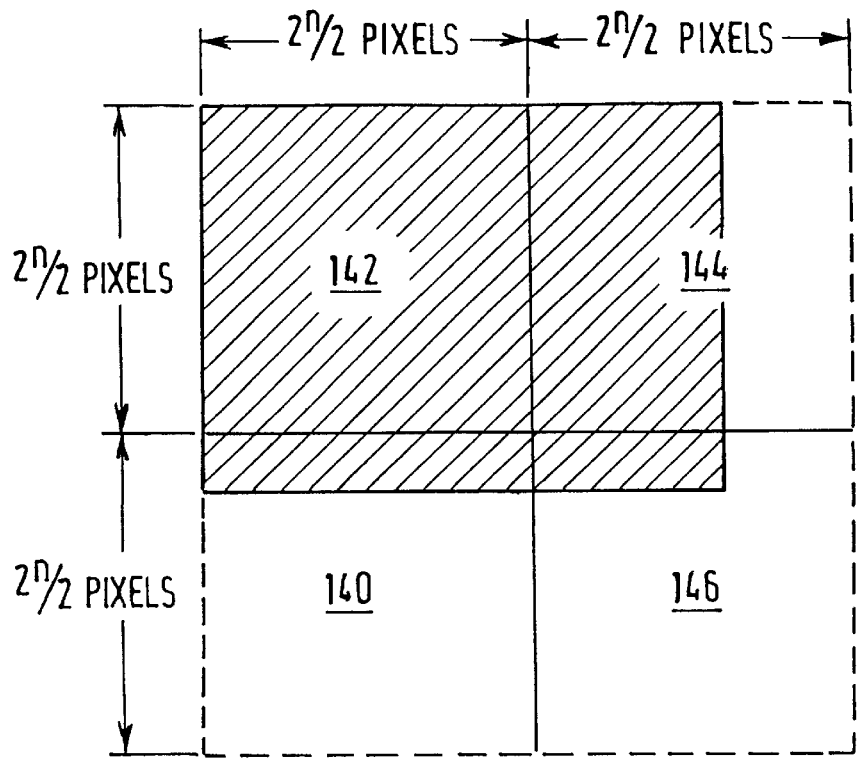

More particularly, referring to FIG. 4c, in this embodiment, depth map processor 50 splits the depth map in half (in terms of the number of pixels) in the width and height directions to create four segments 140, 142, 144, 146 each of size $2^n/2 \times 2^n/2$ pixels.

At step S18, depth map processor 50 reads the depth values of the pixels in each segment 140, 142, 144, 146 created at step S16 and stores the maximum depth and minimum depth for each segment (this corresponding to step S14 but for each segment rather than the depth map image as a whole).

Figure 4D:
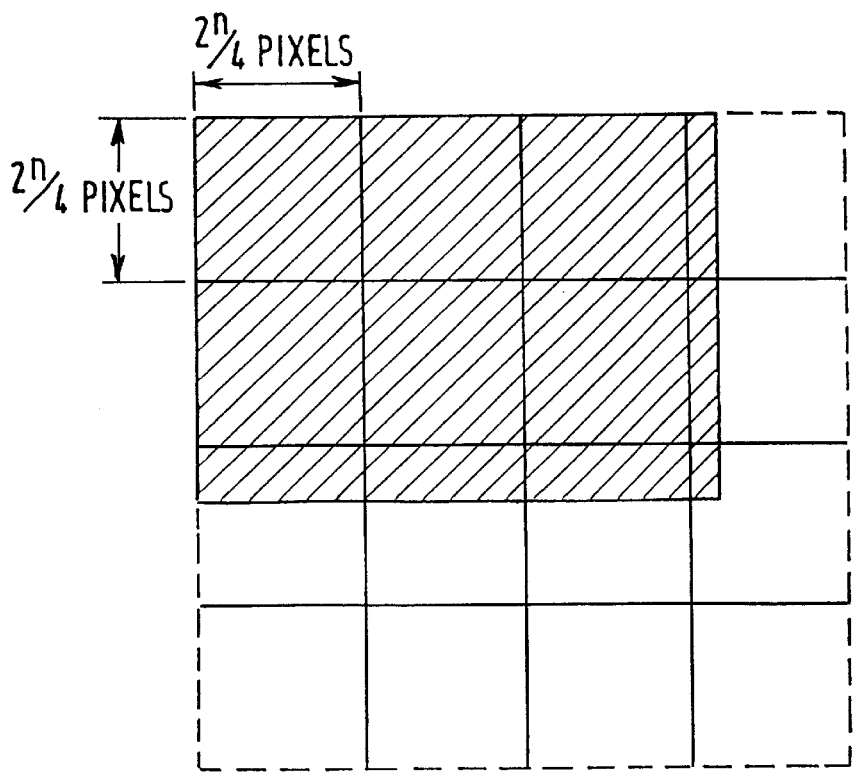
Figure 4E:
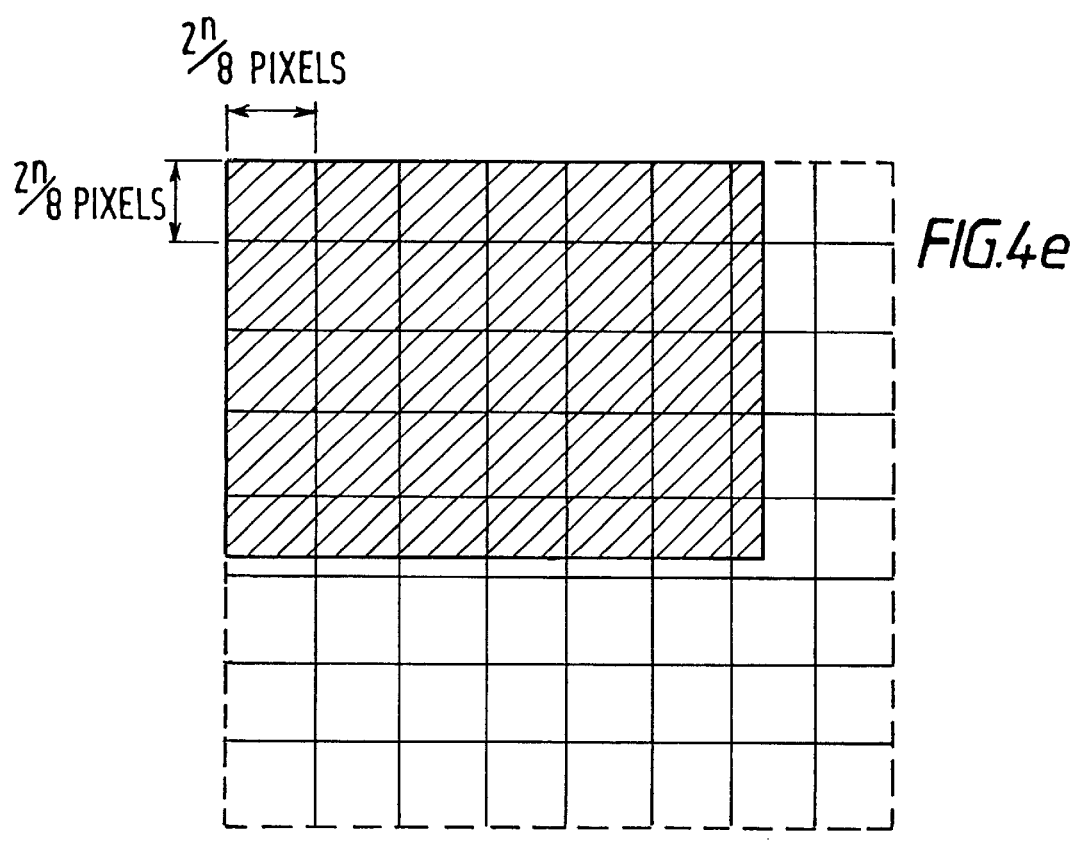

At step S20, depth map processor 50 determines whether further sub-division of the depth map image is to be performed. More particularly, in this embodiment, depth map processor 50 determines whether the segments produced by sub-division at step S16 are of size 2 by 2 pixels. If it is determined that the segments are not yet of this size, steps S16 to S20 are repeated until n–1 sub-divisions have been performed to sub-divide the depth map image into segments of 2 by 2 pixels. Referring to the example shown in FIGS. 4d and 4e, each successive level of sub-division splits each segment created in the previous level of sub-division in half (in terms of the number of pixels) in the width and height directions of the segment.

When it is determined at step S20 that steps S16 and S18 have been performed n–1 times to create sub-division segments of 2 by 2 pixels, the sub-division of that particular depth map image is complete and, at step S22, central controller 20 and depth map processor 50 determine whether there is another depth map image to be processed. Steps S8 to S22 are repeated until all of the input depth map images have been processed in the way described above.

Figure 5:
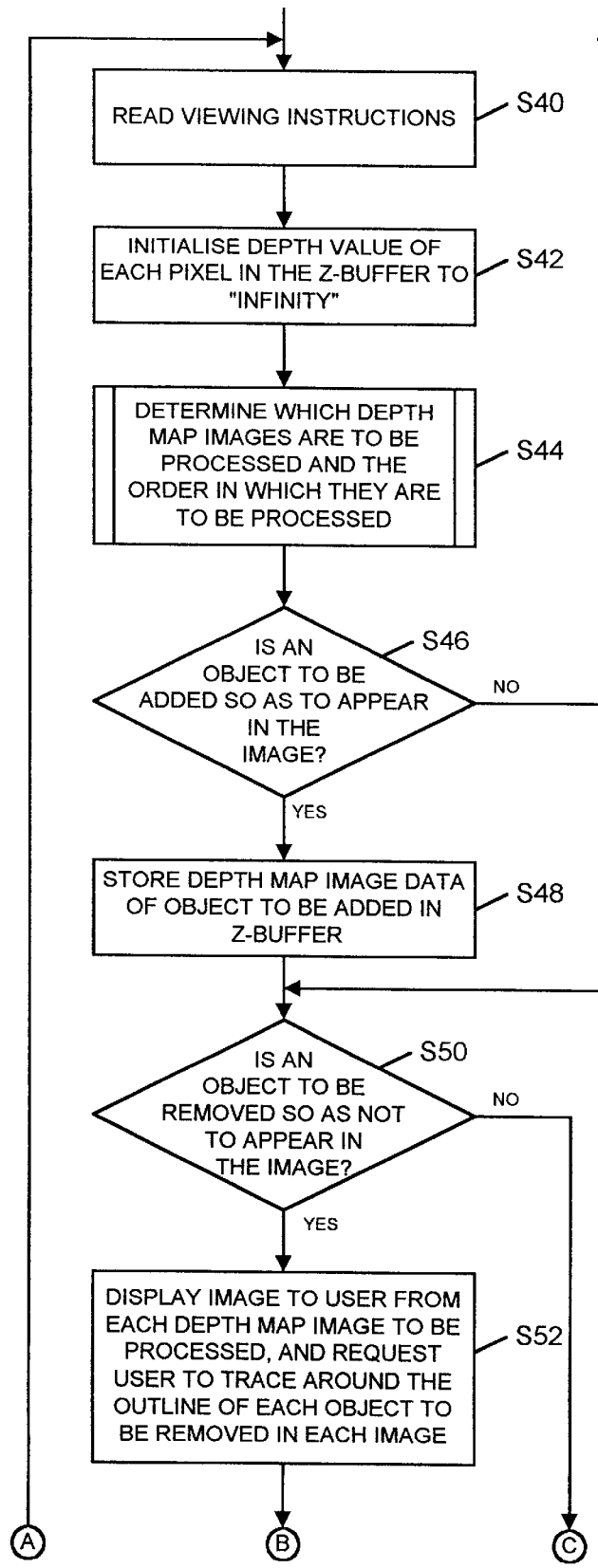
Figure 5:
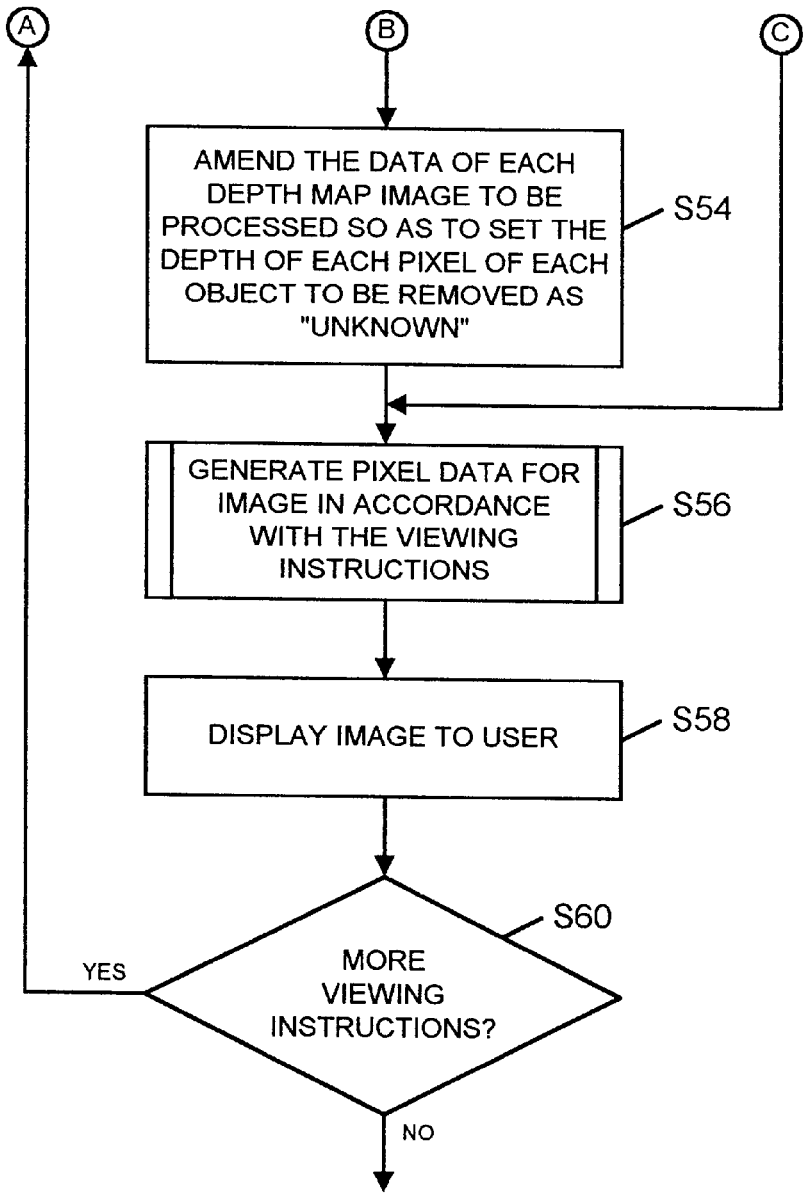

FIG. 5 shows the processing operations performed by processing apparatus 2 in response to the input of viewing instructions from a user defining an output image to be generated.

Referring to FIG. 5, at step S40, the viewing instructions input by the user are read by central controller 20.

Figure 6:
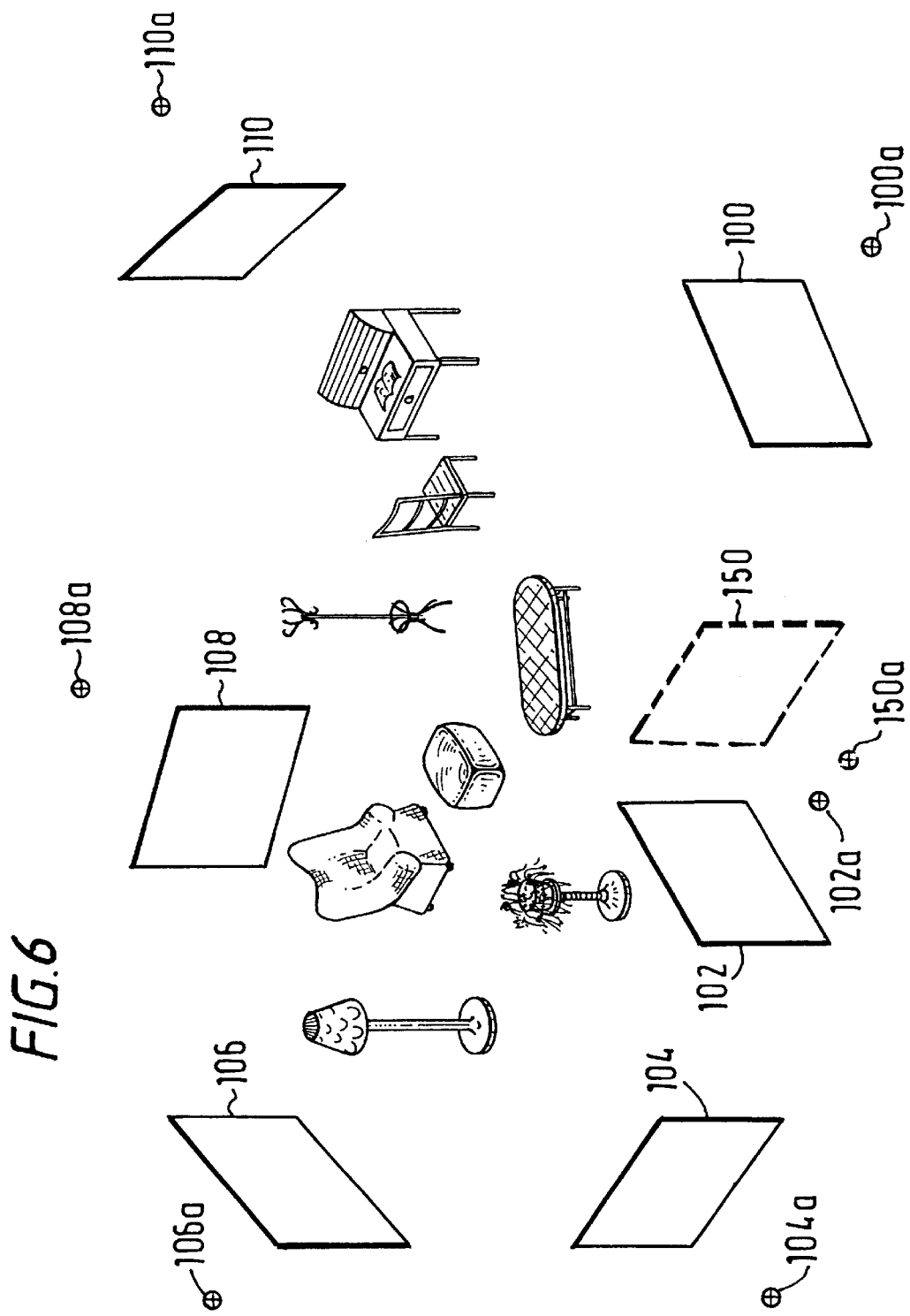

Referring to FIG. 6, the viewing instructions comprise data defining the position, orientation and intrinsic parameters (including the focal point 150a) of a virtual camera for which a virtual depth map image 150 and subsequent output image is to be generated, together with a depth map of any object(s) to be added to appear in the output image and/or instructions that one or more objects are to be removed from the depth map images stored at step S2 so as not to appear in the output image. The viewing instructions therefore define a virtual camera for which data is to be generated defining the image that would be recorded by the virtual camera if it actually existed. Of course, the virtual camera can be defined in the input viewing instructions to be in any position and orientation and need not be constrained in dependence upon the positions and orientations of the input depth map cameras.

At step S42, central controller 20 initialises the depth value of each pixel in the Z-buffer 70 to a depth of "infinity". This is achieved by setting the depth value of each pixel to an arbitrarily large value relative to the focal length of the virtual camera, which, in this embodiment, is $1 \times 10^7 \times$focal length. The initialised pixels in the Z-buffer 70 will subsequently be used as the pixels for the virtual image, and an image and depth value for each pixel will be calculated as described below.

At step S44, depth map processor 50 determines, in dependence upon the viewing instructions read at step S40, which of the input depth map images stored at step S2 are to be processed to generate the data for the virtual depth map image and the order in which the input depth map images are to be processed.

Figure 7:
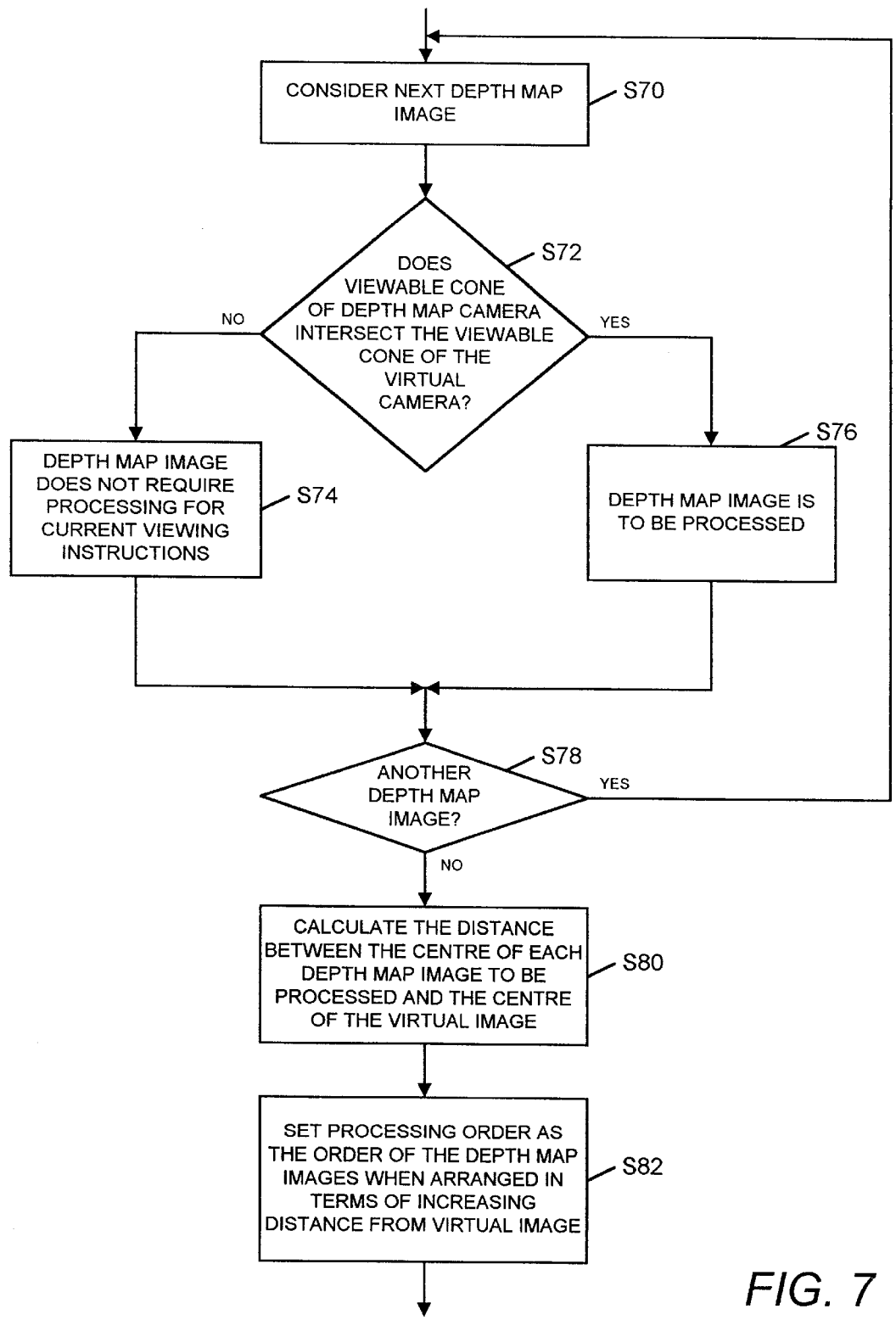
FIG. 7 shows the processing operations performed at step S44 in FIG. 5.

FIG. 7 shows the processing operations performed by depth map processor 50 at step S44.

Referring to FIG. 7, at step S70, depth map processor 50 considers the next depth map image previously stored at step S2 (this being the first depth map image the first time step S70 is performed).

At step S72, depth map processor 50 determines whether the viewable cone of the depth map camera, that is, the cone defined by projecting a ray from the focal point of the depth map camera through the four corner pixels of the depth map image which are not "dummy" pixels, intersects the viewable cone of the virtual camera.

If it is determined at step S72 that the viewable cones of the depth map camera and the virtual camera do not intersect then, at step S74, it is determined that the depth map image does not require processing for the current viewing instructions.

Figure 8A:
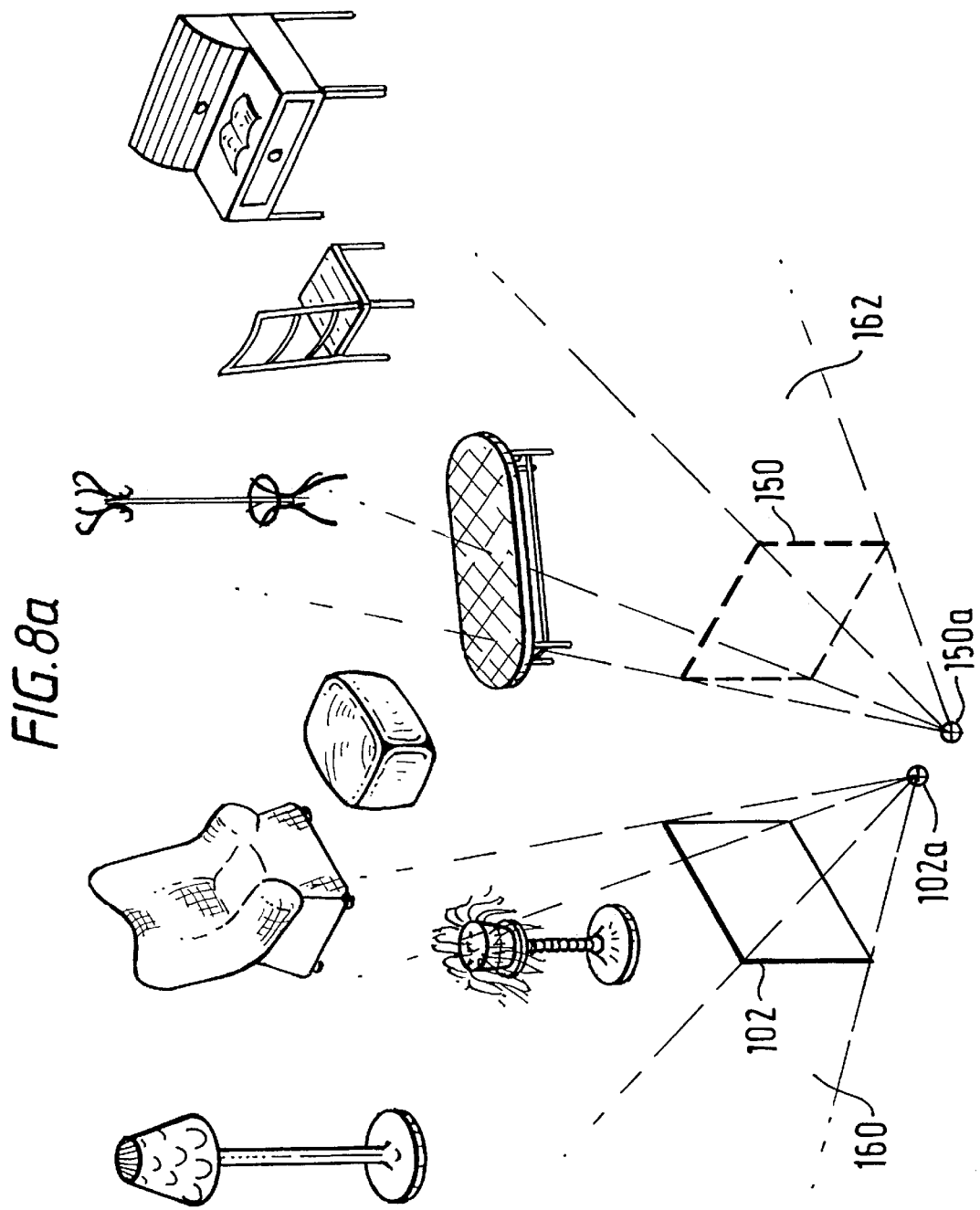
FIGS. 8a and 8b show non-intersecting and intersecting viewable cones respectively, which illustrate the processing performed at step S72 in FIG. 7.

Referring to the example shown in FIG. 8a, the viewable cones for the cameras of the depth map image 102 and the virtual image 150 are shown. As can be seen in the example shown in FIG. 8a, the viewable cone 160 for the depth map camera does not intersect the viewable cone 162 for the virtual camera due to the positions and orientations of the depth map image 102 and virtual image 150 and the positions of the focal points 102a, 150a of the depth map camera and the virtual camera. In such a case, the depth map image 102 can not contain image data for anything which is to appear in the virtual image 150, and accordingly the processing at step S74 determines that the depth map image 102 is not to be considered during the processing to generate data for the virtual image 150.

Figure 8B:
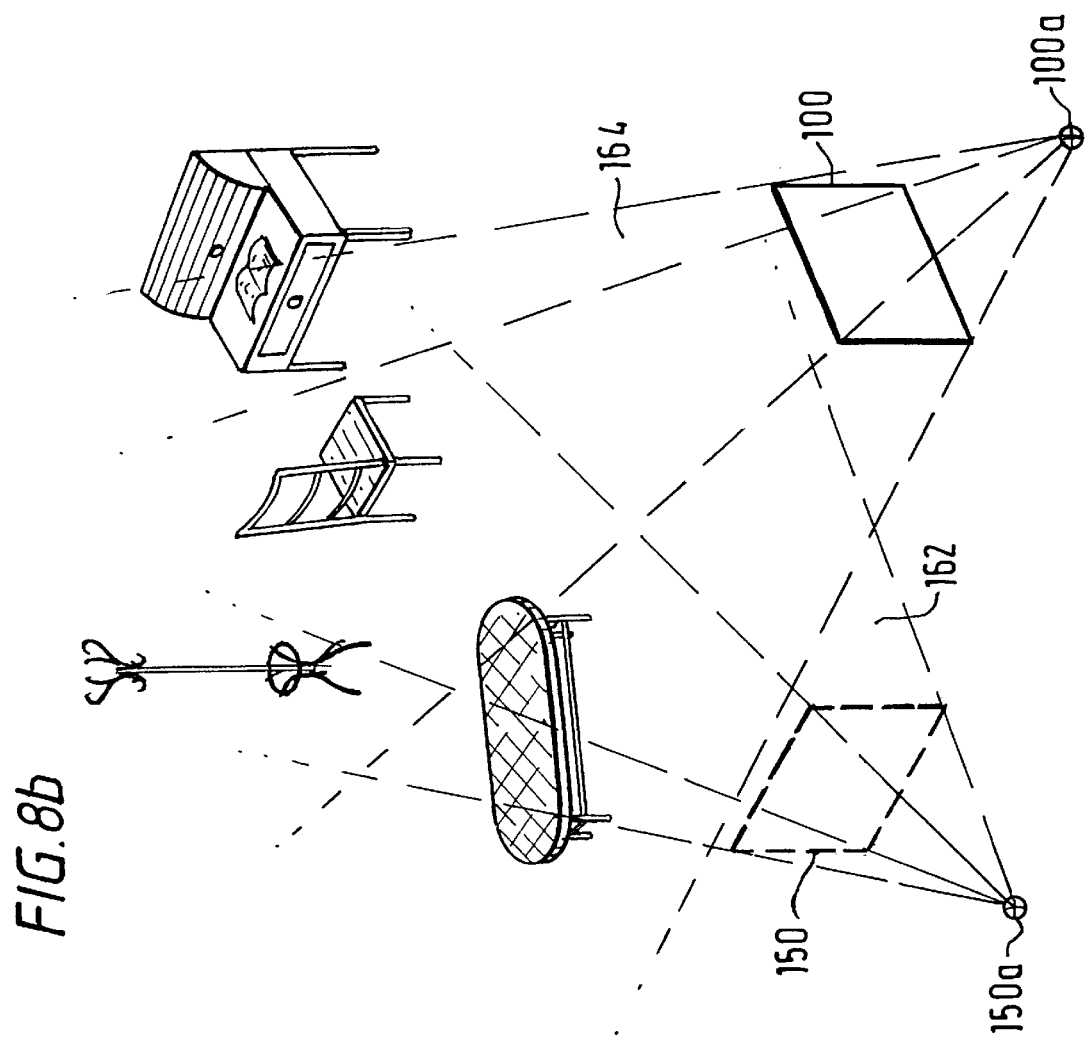

On the other hand, if it is determined at step S72 that the viewable cone of the depth map camera and the viewable cone of the virtual camera do intersect (such as in the example shown in FIG. 8b, in which the viewable cone 162 for the virtual camera and the viewable cone 164 for the camera of the depth map image 100 are shown) then, at step S76, it is determined that the depth map image is to be processed because the depth map image contains pixel data related to objects which can be seen by the virtual camera.

At step S78, central controller 20 determines whether there is another input depth map image stored at step S2 to be processed, and steps S70 to S78 are repeated until each input depth map image has been processed in the way described above.

At step S80, depth map processor 50 calculates the distance between the centre of each depth map image identified at step S76 as a depth map image to be processed and the centre of the virtual image 150.

At step S82, depth map processor 50 sets the processing order of the depth map images to be processed as the order of the depth map images when arranged in terms of increasing distance from the virtual image (that is, with the depth map image having the shortest distance between its centre and the virtual image to be processed first and the depth map image having the largest distance between its centre and the centre of the virtual image to be processed last).

Referring again to FIG. 5, at step S46, central controller 20 determines from the viewing instructions read at step S40 whether an object is to be added so as to appear in the virtual image. Such an object may comprise, for example, the user or another person so that the virtual image shows that person standing in front of the objects 120.

If it is determined at step S46 that an object is to be added to appear in the virtual image, then, at step S48, central controller 20 stores in Z-buffer 70 the data defining a depth map image of the object to be added which is input by the user (for example on a disk 32 or as a signal 34). The depth map image data stored at step S48 therefore comprises data for a depth map image defined for the coordinates of the virtual depth map camera.

On the other hand, if it is determined at step S46 that the viewing instructions do not define that an object is to be added, then step S48 is omitted.

At step S50, central controller 20 determines from the viewing instructions read at step S40 whether an object visible in the depth map images previously input by the user and stored at step S2 is to be removed, so as not to appear in the virtual image.

If it is determined at step S50 that an object is to be removed, then, at step S52, central controller 20 reads the image data from data store 30 of each depth map image identified at step S76 (FIG. 7) as a depth map image to be processed, and causes display processor 80 to display the image to the user on display device 4. Further, central controller 20 causes display processor 80 to display instructions requesting the user to trace around the outline of each object to be removed in each image.

After the user has traced around each object to be removed in each image, at step S54, central controller 20 amends the data of each depth map image to be processed so as to set the depth of each pixel of each object to be removed to a value indicating that the depth is "unknown" so that the pixel will be ignored in subsequent processing to generate data for the virtual image. More particularly, in this embodiment, central controller 20 sets the depth of each pixel of each object to be removed to a value of −1.0.

On the other hand, if it is determined at step S50 that an object is not to be removed, then steps S52 and S54 are omitted.

At step S56, central controller 20 and pixel data generator 60 perform processing to generate pixel data for the virtual image defined in the viewing instructions.

Figure 9:
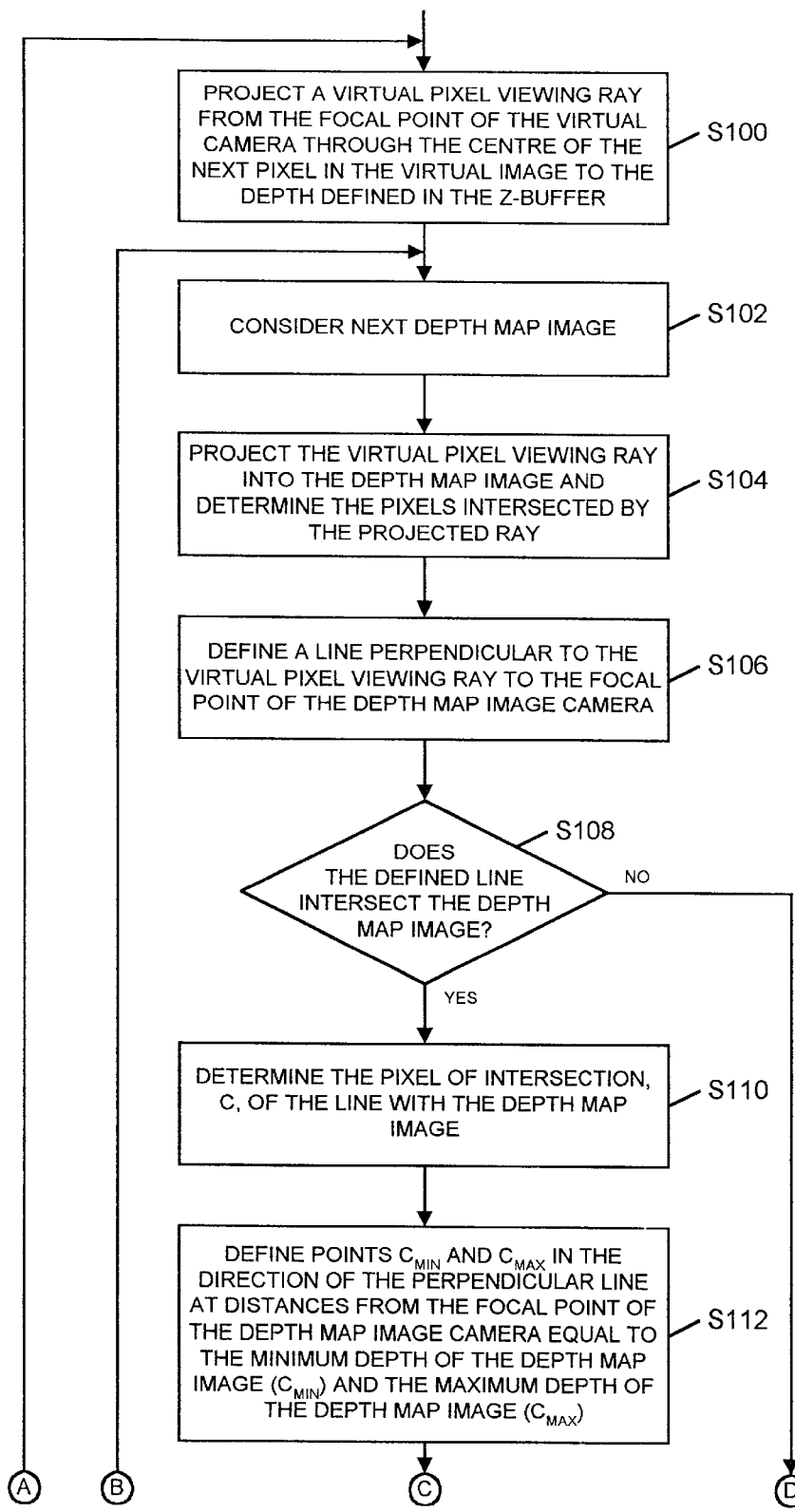
FIG. 9 shows the processing operations performed at step S56 in FIG. 5.
Figure 9:
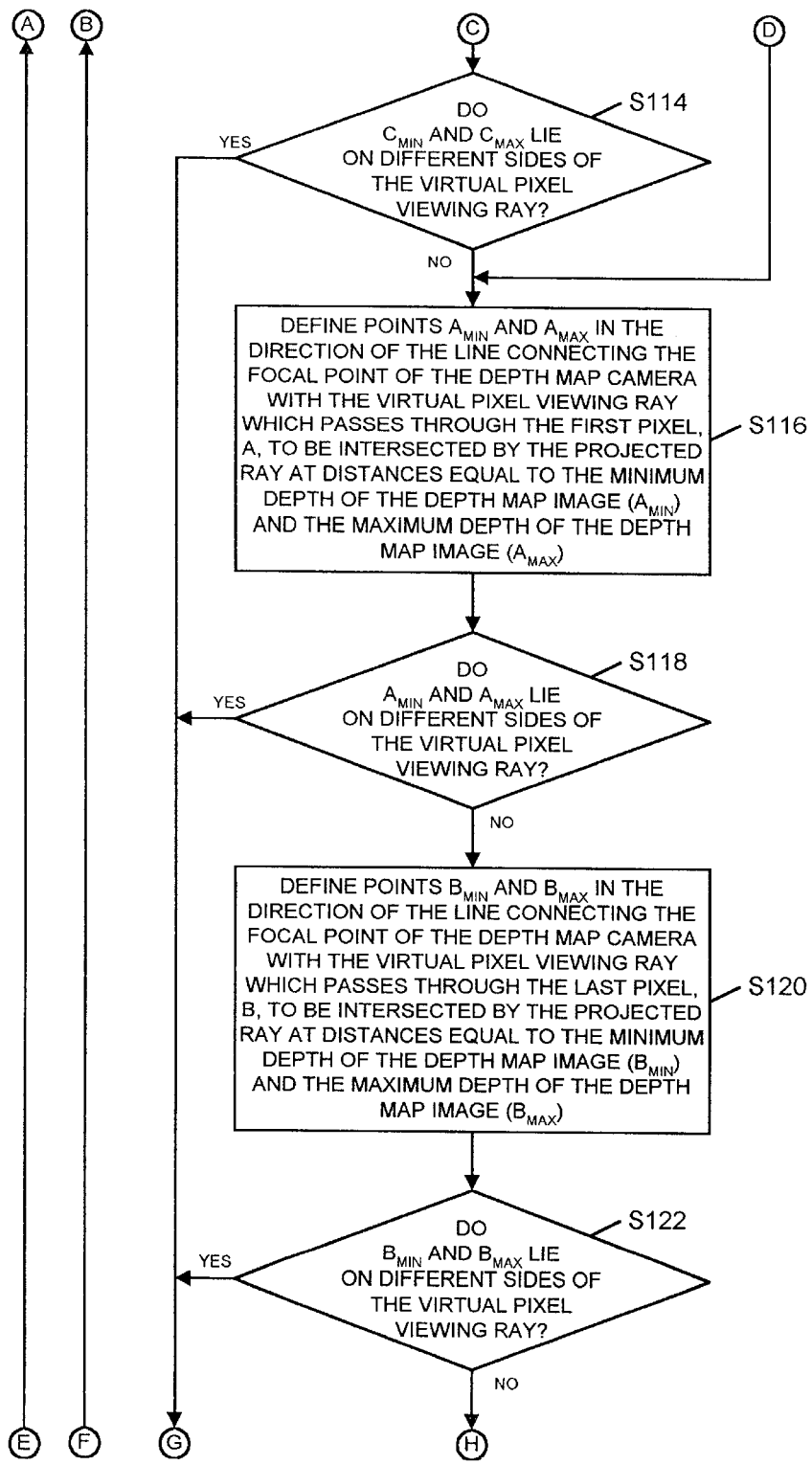
Figure 9:
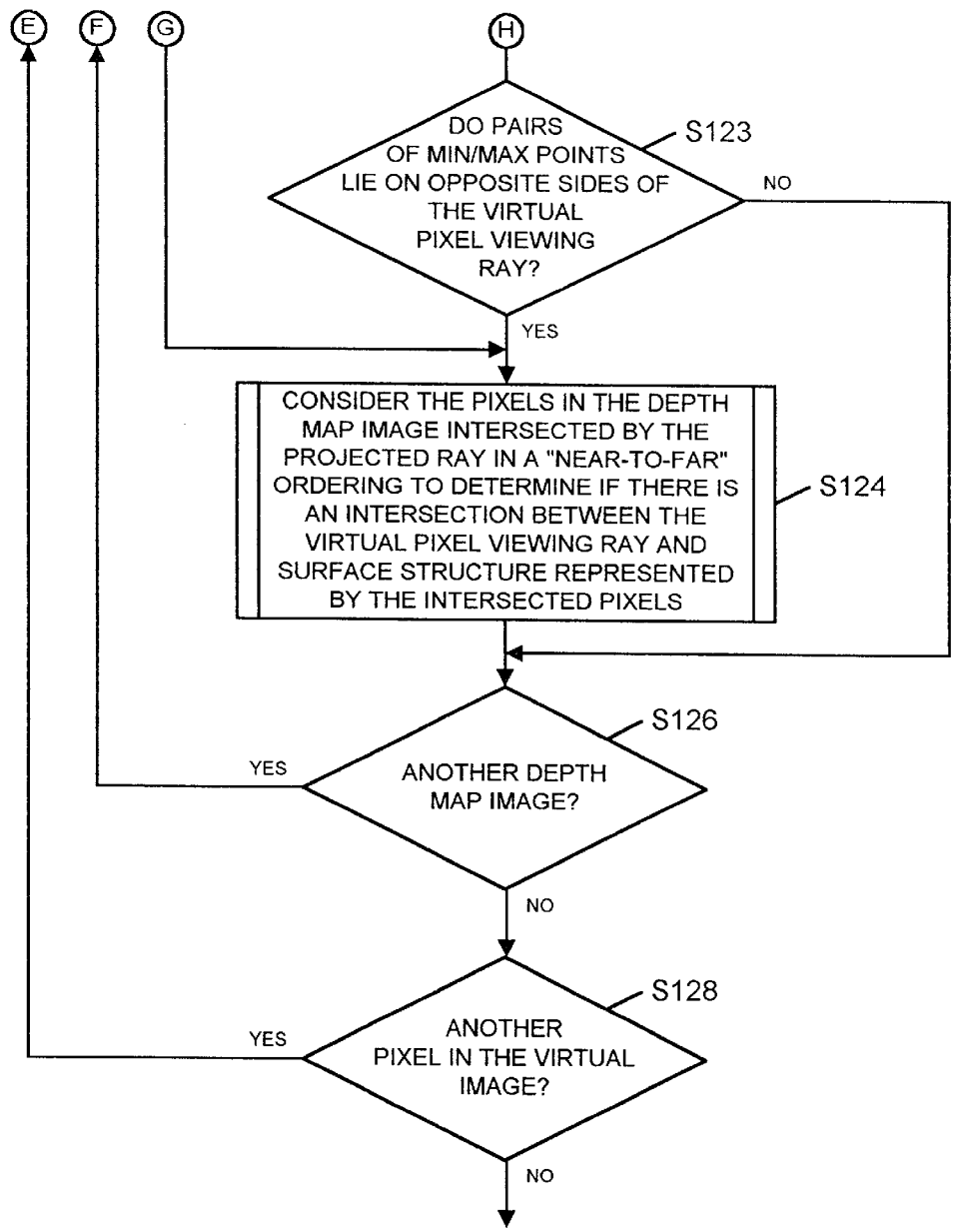

FIG. 9 shows the processing operations performed by central controller 20 and pixel data generator 60 at step S56.

Referring to FIG. 9, at step S100, pixel data generator 60 processes data so as to notionally project a ray (referred to as a "virtual pixel viewing ray") from the focal point 150a of the virtual camera through the centre of the next pixel in the virtual image 150 to the depth defined for that pixel in the Z-buffer 70 (the virtual pixel viewing ray being projected through the centre of the first pixel the first time step S100 is performed).

Figure 10A:
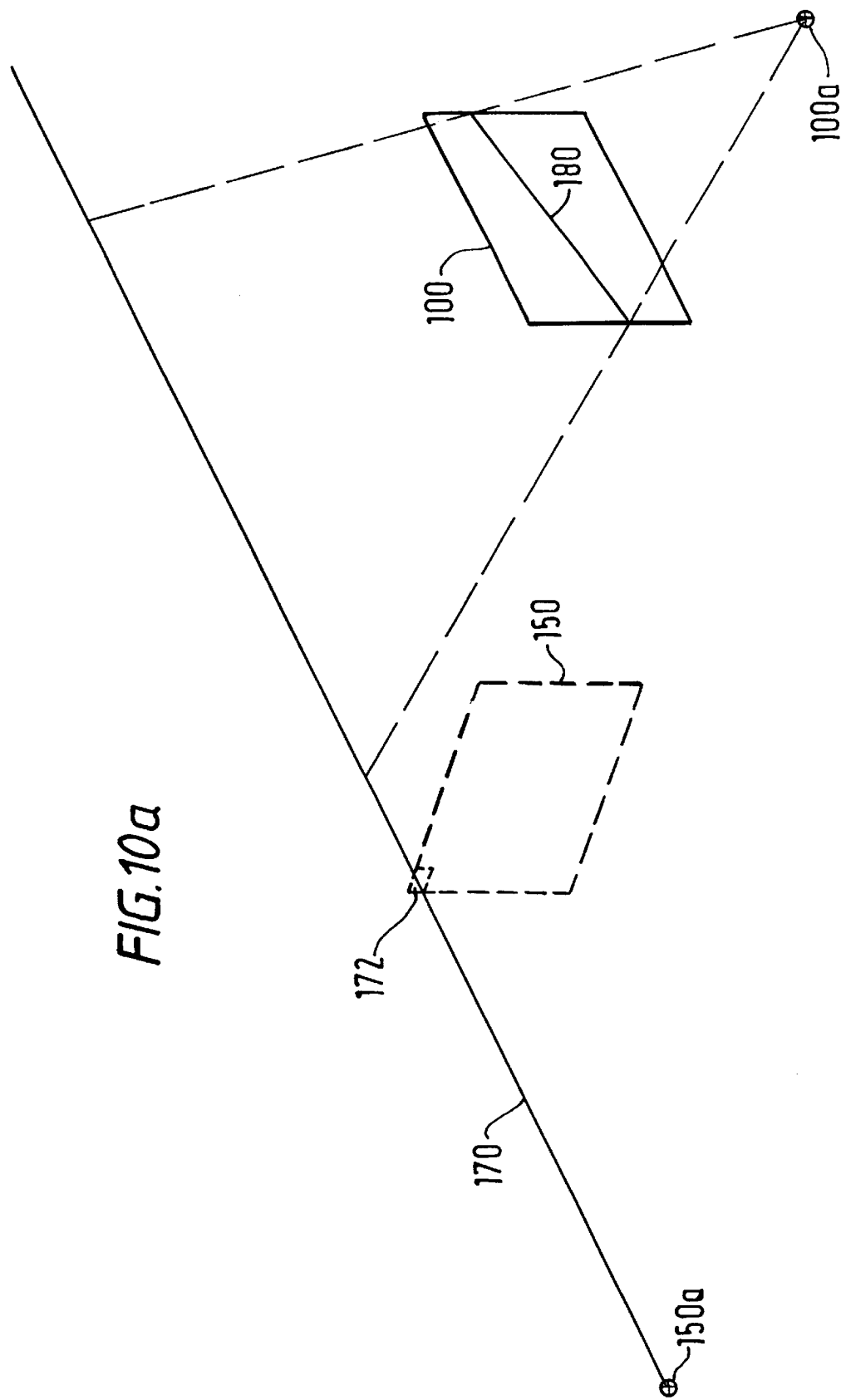

FIG. 10a schematically illustrates the notional projection of the virtual pixel viewing ray at step S100.

Referring to FIG. 10a, the virtual pixel viewing ray 170 is projected from the focal point 150a of the virtual camera through the centre of the pixel 172 in the virtual image 150. As noted above, the length of the projected ray is the same as the depth defined in the Z-buffer 70 for the pixel 172. Accordingly, the first time step S100 is performed for any given pixel, this depth will be either "infinity" (set at step S42) or the depth defined in the depth map image of the object to be added to appear in the virtual image (stored in the Z-buffer 70 at step S48).

At step S102, pixel data generator 60 considers the next depth map image to be processed in accordance with the order previously defined at step S44 (this being the first depth map image defined in the processing order the first time step S102 is performed).

At steps S104 to S122, pixel data generator 60 performs processing to determine whether the pixels in the depth map image represent any part of the scene (surface structure) in the real-world which could be intersected by the virtual pixel viewing ray 170.

More particularly, at step S104, pixel data generator 60 processes data so as to notionally project the virtual pixel viewing ray 170 defined at step S100 into the depth map image currently being considered, and identifies the pixels in the depth map image which are intersected by the projected ray.

Referring again to FIG. 10a, the projection of the virtual pixel viewing ray 170 into the depth map image 100 generates a projected ray 180 in the depth map image 100, and, at step S104, pixel data generator 60 determines which of the pixels in the depth map image 100 are intersected by the projected ray 180 (although intersections with "dummy" pixels added at step S12 are not identified).

In the example shown in FIG. 10a, the virtual pixel viewing ray 170 is defined to a depth which is such that, when it is projected into the depth map image 100, the projected ray 180 traverses the whole of the depth map image 100. However, as illustrated in FIG. 10b, the depth for the virtual pixel defined in the Z-buffer 70 may be sufficiently small that, when the virtual pixel viewing ray 170 is defined at step S100 its length is such that, when it is projected into the depth map image 100, the projected ray 180 spans only part of the depth map image 100.

At step S106, pixel data generator 60 processes data so as to notionally define a line passing through the focal point of the depth map image camera currently being considered which is perpendicular to the virtual pixel viewing ray defined at step S100.

The processing performed at step S106 is schematically shown in FIG. 11, in which a line 190 is defined which passes through the focal point 100a of the depth map image camera and the virtual pixel viewing ray 170, and which is perpendicular to the virtual pixel viewing ray 170.

The perpendicular line defined at step S106 represents the shortest distance between the focal point of the depth map image camera and the virtual pixel viewing ray 170.

At step S108, pixel data generator 60 determines whether the perpendicular line defined at step S106 intersects the depth map image currently being considered.

If it is determined at step S108 that the line does intersect the depth map image, then, at step S110, pixel data generator 60 identifies the pixel within the depth map image which the line intersects, this pixel being referred to as pixel "C" as shown in FIG. 11.

Figure 12A:
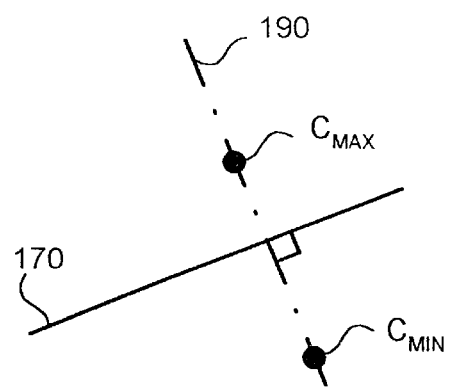
FIGS. 12a, 12b and 12c illustrate the processing operations to define and test points at steps S112 and S114 in FIG. 9.
Figure 12B:
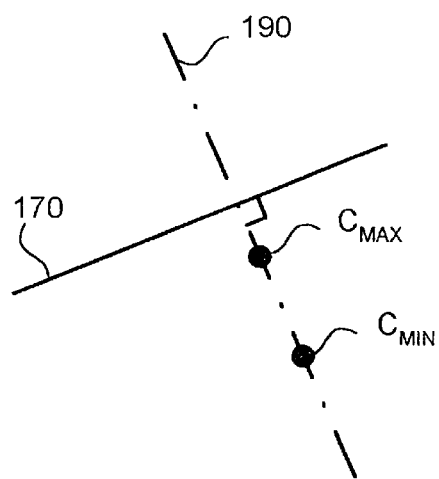
Figure 12C:
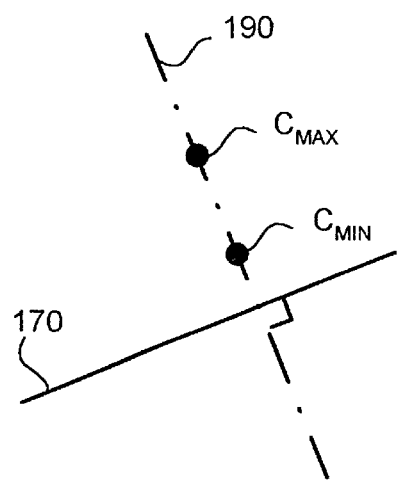

At step S112, pixel data generator 60 defines two points, referred to as $C_{MIN}$ and $C_{MAX}$ in the direction of the perpendicular line defined at step S106 at distances from the focal point of the depth map image camera equal to the minimum depth of the depth map image previously stored at step S14 (this point being $C_{MIN}$) and the maximum depth of the depth map image previously stored at step S14 (this point being $C_{MAX}$), for example as shown in FIGS. 12a, 12b and 12c.

At step S114, pixel data generator 60 determines whether the points $C_{MIN}$ and $C_{MAX}$ defined at step S112 lie on different sides of the virtual pixel viewing ray 170. In this embodiment, pixel data generator 60 performs the test to determine whether $C_{MIN}$ and $C_{MAX}$ lie on different sides of the virtual pixel viewing ray by calculating the sign (positive or negative) of the dot product of the vector $(C_{MIN}-C_V)$ and the vector m and calculating the sign of the dot product of the vector $(C_{MAX}-C_V)$ and m, where $C_V$ is the position of the focal point 150a of the virtual camera and m is given by:

$$m = (C_d - C_v) - \frac{[(C_d - C_v) \cdot \underline{n}]\underline{n}}{|\underline{n}|^2} \qquad (1)$$

$C_d$ being the position of the focal point 100a of the depth map camera; and n being a vector having a length and direction the same as those of the virtual pixel viewing ray 170.

If it is determined that the sign of the dot product of $(C_{MIN}-C_V)$ and m is different from the sign of the dot product of $(C_{MAX}-C_V)$ and m, then it is determined that the points $C_{MIN}$ and $C_{MAX}$ lie on different sides of the virtual pixel viewing ray 170.

More particularly, referring to FIGS. 12a, 12b and 12c, depending upon the minimum and maximum depths in the depth map image previously stored at step S14, the points $C_{MIN}$ and $C_{MAX}$ on the perpendicular line 190 may lie on different sides of the virtual pixel viewing ray, as shown in FIG. 12a, or on the same side of the virtual pixel viewing ray, as shown in FIG. 12b and FIG. 12c.

If it is determined at step S114 that the points $C_{MIN}$ and $C_{MAX}$ lie on different sides of the virtual pixel viewing ray 170, then it is determined that the pixels in the depth map image represent surface structure in the real-world which could be intersected by the virtual pixel viewing ray 170, this being because the range of depths of the surface structure represented in the depth map image span the virtual pixel viewing ray 170. Consequently, processing proceeds to step S124, in which tests are carried out to determine whether there is an actual intersection between surface structure represented by pixels in the depth map image and the virtual pixel viewing ray 170, as will be described in detail below.

On the other hand, if it is determined at step S114 that the points $C_{MIN}$ and $C_{MAX}$ lie on the same side of the virtual pixel viewing ray, or if it is determined at step S108 that the perpendicular line 190 defined at step S106 does not intersect the depth map image, then, at step S116, pixel data generator 60 defines two points, referred to as $A_{MIN}$ and $A_{MAX}$ along a line (line 192 in FIG. 11) connecting the virtual pixel viewing ray 170 with the focal point 100a of the depth map camera which passes through the first pixel in the depth map image to be intersected by the projected ray 180. In this embodiment, the line 192 is projected from the focal point 100a of the depth map camera through the centre of the pixel in the depth map image, as this simplifies the processing, event though the resulting line may not actually touch the virtual pixel viewing ray 170 (any gap being small and having a negligible effect on subsequent processing).

More particularly, the first pixel to be intersected by the projected ray 180 is defined to be the pixel containing the part of the projected ray 180 which corresponds to the part of the virtual pixel viewing ray 170 which is nearest to the focal point 150a of the virtual camera. The points $A_{MIN}$ and $A_{MAX}$ are defined at positions along the ray through the first pixel, A, connecting the focal point 100a of the depth map camera with the virtual pixel viewing ray 170 at distances corresponding to the minimum depth of the depth map image previously stored at step S14 and the maximum depth of the depth map image previously stored at step S14, respectively.

At step S118, pixel data generator 60 determines whether the points $A_{MIN}$ and $A_{MAX}$ defined at step S116 lie on different sides of the virtual pixel viewing ray 170. This test is performed in the same way as the test previously described at step S114, but with the points $A_{MIN}$ and $A_{MAX}$ replacing the points $C_{MIN}$ and $C_{MAX}$ respectively. Accordingly, the description will not be repeated again here.

If it is determined at step S118 that the points $A_{MIN}$ and $A_{MAX}$ lie on different sides of the virtual pixel viewing ray 170, then it is determined that the pixels of the depth map image being processed represent surface structure in the real-world which could be intersected by the virtual pixel viewing ray 170 if this ray existed in the real-world. Accordingly, in this case, processing proceeds to step S124, in which tests are carried out to determine if pixels in the depth map image do actually represent surface structure intersected by the virtual pixel viewing ray 170, as will be described in detail below.

On the other hand, if it is determined at step S118 that the points $A_{MIN}$ and $A_{MAX}$ lie on the same side of the virtual pixel viewing ray, then, at step S120, step S116 is repeated, but this time for a ray passing through the last pixel (B in FIG. 11) in the depth map image to be intersected by the projected ray 180.

More particularly, pixel data generator 60 defines two points $B_{MIN}$ and $B_{MAX}$ along the line (line 194 in FIG. 11) connecting the virtual pixel viewing ray 170 with the focal point 100a of the depth map camera which passes through the last pixel in the depth map image to be intersected by the projected ray 180 defined at step S104 (the last pixel being the pixel which contain the part of the projected ray 180 which corresponds to the furthest part of the pixel viewing ray 170 projected into the depth map image). The points $B_{MIN}$ and $B_{MAX}$ are defined along line 194 at distances corresponding to the minimum depth of the depth map image and the maximum depth of the depth map image respectively, as previously stored at step S14.

At step S122, pixel data generator 60 determines whether the points $B_{MIN}$ and $B_{MAX}$ lie on different sides of the virtual pixel viewing ray 170. This test is performed in the same way as the test previously described at step S114, but with the points $B_{MIN}$ and $B_{MAX}$ replacing the points $C_{MIN}$ and $C_{MAX}$ respectively. Accordingly, the description will not be repeated again here.

If it is determined at step S122 that the points $B_{MIN}$ and $B_{MAX}$ lie on the same side of the virtual pixel viewing ray 170 then, at step S123, pixel data generator 60 determines whether a pair of the MIN/MAX points previously tested at steps S114, S118 and S122 (that is $A_{MIN}$ and $A_{MAX}$, $B_{MIN}$ and $B_{MAX}$ or $C_{MIN}$ and $C_{MAX}$) lie on one side of the virtual pixel viewing ray 170 while another of the pairs lies on the other side of the virtual pixel viewing ray 170. This step is performed by comparing the signs of the dot products calculated as described above when testing the points at steps S114, S118 and S122.

If it is determined at step S123 that all of the pairs of MIN/MAX points lie on the same side of the virtual pixel viewing ray, then, as a result of the tests performed at steps S114, S118, S122 and S123, it has been determined that all of the points $A_{MIN}$, $A_{MAX}$, $B_{MIN}$, $B_{MAX}$, $C_{MIN}$ and $C_{MAX}$ lie on the same side of the virtual pixel viewing ray 170. Consequently, it is determined that the pixels in the current depth map image being considered can not represent surface structure which would be intersected by the virtual pixel viewing ray 170. Accordingly, in this case, processing proceeds to step S126.

On the other hand, if it is determined at step S123 that one pair of MIN/MAX points lies on the opposite side of the virtual pixel viewing ray 170 to the other pairs of MIN/MAX points, or if it is determined at step S122 that the points $B_{MIN}$ and $B_{MAX}$ lie on different sides of the virtual pixel viewing ray 170, or if it is determined at step S114 that the points $C_{MIN}$ and $C_{MAX}$ lie on different sides of the virtual pixel viewing ray 170, or if it is determined at step S118 that the points $A_{MIN}$ and $A_{MAX}$ lie on different sides of the virtual pixel viewing ray 170, then, at step S124, pixel data generator 60 tests the pixels in the depth map image which are intersected by the projected ray 180 in a near-to-far ordering (that is, from pixel A to pixel B in the direction of the arrow 196 in FIG. 11) to determine if there is an actual intersection between the virtual pixel viewing ray 170 and surface structure represented by the pixels intersected by the projected ray 180.

FIG. 13 shows the processing operations performed by pixel data generator 60 at step S124.

Referring to FIG. 13, in this embodiment, rather than testing each of the pixels in the depth map image intersected by the projected ray 180 individually in turn, pixel data generator 60 considers the segments in the depth map image created at step S16 and the maximum and minimum depth of the pixels in each segment stored at step S18 in order to eliminate tests on pixels which cannot represent surface structure intersected by the virtual pixel viewing ray 170. It has been found in practice that this way of performing step S124 considerably reduces processing requirements and processing time.

Figure 14A:
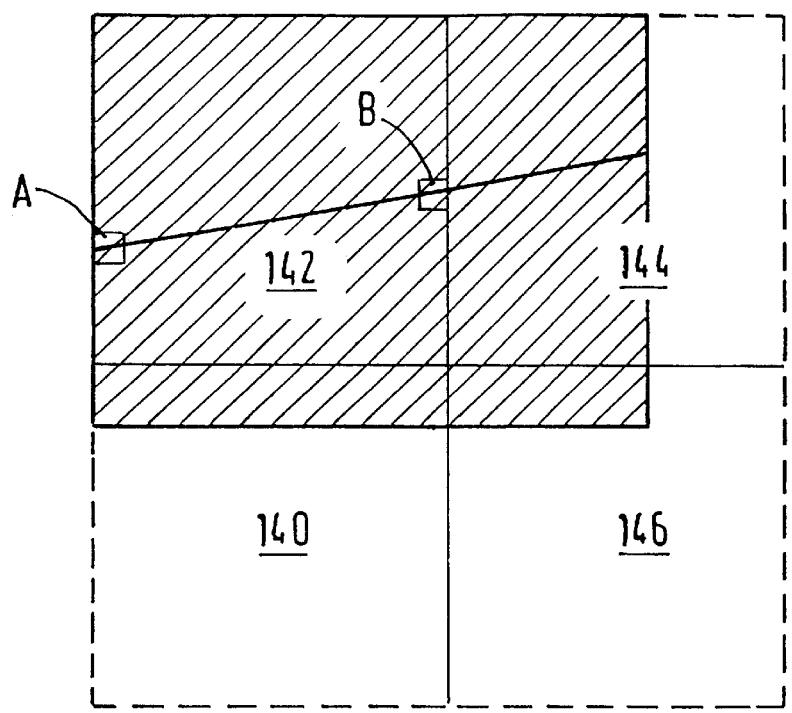

At step S150, pixel data generator 60 considers the next level of sub-division of the depth map image (this being the first level of sub-division shown in FIG. 14a the first time step S150 is performed).

At step S152 pixel data generator 60 considers the next segment in the sub-division level currently being considered which contains part of the projected ray 180. More particularly, pixel data generator 60 considers the segments in the direction of the arrow 196 shown in FIG. 11 so that the segment which contains the part of the projected ray 180 which corresponds to the portion of the pixel viewing ray 170 closest to the focal point 150a of the virtual camera is considered first and the segment which contains the part of the projected ray 180 which corresponds to the portion of the virtual pixel viewing ray 170 which is furthest from the focal point 150a of the virtual camera is considered last. Thus, referring to FIG. 14a, the first time step S152 is performed, the segment 142 is considered.

At steps S154 to S166 pixel data generator 60 performs tests to determine whether the pixels of the segment currently being considered have depths such that they could represent surface structure intersected by the virtual pixel viewing ray 170. On the basis of these tests, a decision is then made as to whether further tests need to be carried out to determine whether such an intersection actually does exist or whether the segment can be discarded and the next segment considered.

More particularly, at step S154, pixel data generator 60 determines whether the current segment contains the pixel C previously identified at step S110 as the pixel intersected by the perpendicular line 190 from the virtual pixel viewing ray 170 to the focal point 100a of the depth map image camera.

If it is determined at step S154 that the pixel C lies within the current segment of the depth map image then, at steps S156 and S158, pixel data generator 60 repeats the processing performed at steps S112 and S114, described above. This time, however, at step S156 the points $C_{MIN}$ and $C_{MAX}$ are defined along the line 190 at distances corresponding to the minimum depth and maximum depth of the pixels in the current segment, rather than the minimum depth and maximum depth of the pixels in the depth map image as a whole, as at step S112. As these processing operations have been described above, the description will not be repeated here.

If it is determined at step S158 that the points $C_{MIN}$ and $C_{MAX}$ lie on the same side of the virtual pixel viewing ray 170, or if it is determined at step S154 that the pixel C does not lie within the current segment being considered, then, at step S160 and S162 pixel data generator 60 repeats the processing previously performed at steps S116 and S118. This time, however, at step S160 the points $A_{MIN}$ and $A_{MAX}$ are defined along a line connecting the virtual pixel viewing ray 170 with the focal point 100a of the depth map camera which passes through the first pixel A in the current segment (rather than the first pixel in the depth map image as a whole) to be intersected by the projected ray 180 at distances equal to the minimum depth and maximum depth of the current segment (rather than the minimum depth and maximum depth of the depth map image as a whole). Of course, if the segment being considered is the first segment in the depth map image to contain part of the projected ray 180 then, as shown in FIG. 14a, the first pixel A to be intersected by the projected ray 180 in the segment is the same as the first pixel A to be intersected by the projected ray 180 in the depth map image as a whole. Again, as these processing operations have been described above, the description will not be repeated here.

If it is determined at step S162 that the points $A_{MIN}$ and $A_{MAX}$ defined at step S160 lie on the same side of the virtual pixel viewing ray 170 then, at step S164 and S166, pixel data generator 60 repeats the processing previously performed at steps S120 and S122. However, at step S164, pixel data generator 60 defines the points $B_{MIN}$ and $B_{MAX}$ along a line connecting the virtual pixel viewing ray 170 with the focal point 100a of the depth map camera which passes through the last pixel in the current segment (rather than the last pixel in the depth map image as a whole) to be intersected by the projected ray 180 at distances equal to the minimum depth and maximum depth of the pixels in the current segment (rather than the minimum depth and maximum depth of the pixels in the depth map image as a whole). The last pixel, B, intersected by the projected ray 180 in the segment 142 at the first level of sub-division is shown in FIG. 14a.

If it is determined at step S166 that the points $B_{MIN}$ and $B_{MAX}$ do not lie on different sides of the virtual pixel viewing ray 170, then, at step S167 pixel data generator 60 repeats the processing previously performed at step S123. This time, however, at step S167, the MIN and MAX points tested are those defined at steps S156, S160 and S164. Again, as the processing operations have been described above, the description will not be repeated here.

If it is determined at step S167 that all of the pairs of points $A_{MIN}$ and $A_{MAX}$, $B_{MIN}$ and $B_{MAX}$, and $C_{MIN}$ and $C_{MAX}$ lie on the same side of the virtual pixel viewing ray 170, then it is determined that the segment currently being considered cannot contain pixels representing surface structure which could be intersected by the virtual pixel viewing ray 170 (because all points represented in the segment lie on the same side of the virtual pixel viewing ray 170). Accordingly, in this case, processing proceeds to step S172 so that another segment can be considered.

On the other hand, if it is determined at step S167 that one pair of MIN/MAX points lie on the opposite side of the virtual pixel viewing ray 170 to the other pairs of MIN/MAX points, or if it is determined at step S158 that the points $C_{MIN}$ and $C_{MAX}$ lie on different sides of the virtual pixel viewing ray 170, or at step S162 that the points $A_{MIN}$ and $A_{MAX}$ lie on different sides of the virtual pixel viewing ray 170, or at step S166 that the points $B_{MIN}$ and $B_{MAX}$ lie on different sides of the virtual pixel viewing ray 170 then, it is determined that, on the basis of the depths of the pixels in the current segment being considered, the pixels may represent surface structure which is intersected by the virtual pixel viewing ray 170 and that tests need to be carried out to determine whether such an intersection actually exists.

Accordingly, processing proceeds to step S168, at which pixel data generator 60 determines whether another level of sub-division of the depth map image exists. That is, at step S168, pixel data generator 60 determines whether the current segment (selected at step S152) is of size 2 by 2 pixels. Steps S150 to S168 are repeated until it is determined at step S168 that the current segment being considered is of size 2 by 2 pixels.

Figure 14B:
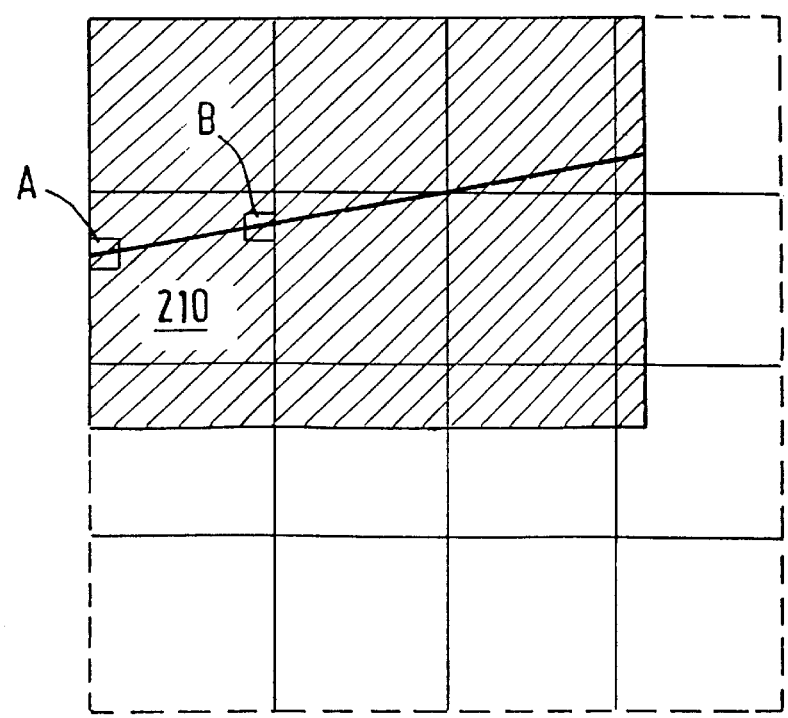

Referring to FIGS. 14a and 14b by way of example, if it is determined when performing processing for segment 142 in FIG. 14a at one of steps S158, S162 or S166 that the points $C_{MIN}$ and $C_{MAX}$, $A_{MIN}$ and $A_{MAX}$ or $B_{MIN}$ and $B_{MAX}$ lie on different sides of the virtual pixel viewing ray 170, then the next time step S150 is performed, the next level of sub-division shown in FIG. 14b is considered and, at step S152, the segment 210 in FIG. 14b is considered. Similarly, if it is determined for the segment 210 at one of steps S158, S162 or S166 that the points $C_{MIN}$ and $C_{MAX}$, $A_{MIN}$ and $A_{MAX}$ or $B_{MIN}$ and $B_{MAX}$ lie on different sides of the virtual pixel viewing ray 170 then, the next time step S150 is performed, the level of sub-division shown in FIG. 14c is considered and, at step S152, the segment 220 within this sub-division level is considered.

When it is determined at step S168 that the segment currently being considered as of size 2 by 2 pixels, processing proceeds to step S170 in which pixel data generator 60 tests the pixels within the segment to determine if the virtual pixel viewing ray 170 actually intersects surface structure represented by the pixels.

FIG. 15 shows the processing operations performed by pixel data generator 60 at step S170.

Referring to FIG. 15, at step S200, pixel data generator 60 reads the list of pixels intersected by the projected ray 180 previously identified at step S104, and determines whether at least two of the four pixels in the current segment which have depth values which are not "unknown" are intersected by the projected ray 180.

If it is determined at step S200 that there are not at least two pixels in the current segment which are intersected by the projected ray 180 and which have depth values which are not "unknown", then processing proceeds to step S212, at which it is determined that the pixels in the current segment do not represent surface structure which is intersected by the virtual pixel viewing ray 170.

On the other hand, if it is determined at step S200 that the current segment does contain at least two pixels which are intersected by the projected ray 180 and which have depth values which are not "unknown", then, at step S202, pixel data generator 60 determines whether the segment currently being considered is the first segment in the depth map image intersected by the projected ray 180.

If it is determined at step S202 that the current segment is the first segment intersected by the projected ray 180, then, at step S204, pixel data generator 60 reads the depth value of the first pixel (pixel 258 in FIG. 16) in the segment intersected by the projected ray 180 which does not have an "unknown" depth and defines a point (point $W_1$ in FIG. 16) in the direction of the line (line 250 in FIG. 16) connecting the virtual pixel viewing ray 170 with the focal point 100a of the depth map camera which passes through the first pixel at a distance from the focal point 100a equal to the depth of the first pixel defined in the depth map image. (In this embodiment, line 250 is projected from the focal point 100a of the depth map camera through the centre of the pixel, even though this may result in a line which does not actually meet the virtual pixel viewing ray—the errors being negligible.) The first pixel in the segment to be intersected by the projected ray 180 is defined to be the pixel containing the part of the projected ray 180 which corresponds to the part of the virtual pixel viewing ray 170 which is nearest to the focal point 150a of the virtual camera.

The point $W_1$ defined at step S204 therefore corresponds to the real-world surface structure represented by the pixel 258, through which the line 250 is drawn.

On the other hand, if it is determined at step S202 that the current segment being considered is the first segment intersected by the projected ray 180 in the depth map image, then step S204 is omitted since, as will be described below, the processing performed at step S204 will already have been performed at step S176 when transferring from the proceeding segment to the current segment.

At step S206, pixel data generator 60 reads the depth value of the next pixel in the segment which is intersected by the projected ray 180 (that is, the pixel containing the next part of the projected ray 180 in terms of increasing distance of the virtual pixel viewing ray 170 from the focal point 150a of the virtual camera) and which does not have a depth value of "unknown". Pixel data generator 60 then defines a point $W_i$ in the direction of the line connecting the virtual pixel viewing ray 170 with the focal point 100a of the depth map camera which passes through the centre of the pixel at a distance from the focal point 100a equal to the depth of the pixel. Again, the point $W_i$ defines the position of the real-world surface structure represented by the pixel. Referring to the example shown in FIG. 16, the first time step S206 is performed, the depth of pixel 260 is read and the point $W_2$ is defined at a distance from the focal point 100a corresponding to the depth pixel 260 along line 252 connecting the virtual pixel viewing ray 170 with the focal point 100a.

At step S208, pixel data generator 60 tests whether the points $W_i$ and $W_{i-1}$ (that is, $W_2$ and $W_1$ the first time step S208 is performed) lie on different sides of the virtual pixel viewing ray 170. More particularly, at step S208, pixel data generator 60 performs the same tests previously described above for step S114, but using the positions of the points $W_i$ and $W_{i-1}$ instead of the positions of the points $C_{MIN}$ and $C_{MAX}$. As this processing has been described above, the description will not be repeated here.

If it is determined at step S208 that the points $W_i$ and $W_{i-1}$ lie on the same side of the virtual pixel viewing ray 170, then it is determined that the virtual pixel viewing ray 170 does not intersect surface structure represented by the pixels for which the points $W_i$ and $W_{i-1}$ were defined. In this case, therefore, processing proceeds to step S210 in which pixel data generator 60 determines whether there is another pixel in the current segment which is intersected by the projected ray 180 and which does not have an "unknown" depth (there being, a maximum of 3 pixels out of the 4 pixels in the segment which could be intersected by the projected ray 180).

If it is determined at step S210 that there are no further pixels in the segment currently being considered which are intersected by the projected ray 180 and which do not have an "unknown" depth value then, at step S212, it is determined that the virtual pixel viewing ray 170 does not intersect any surface structure represented by pixels in the current segment.

On the other hand, if it is determined at step S210 that there is a further (third) pixel in the current segment intersected by the projected ray which does not have a depth of "unknown", then steps S206 and S208 are repeated for this further pixel. Thus, referring to the example shown in FIG. 16, when step S206 is repeated the point $W_3$ is defined along the line 254 which connects the virtual pixel viewing ray 170 with the focal point 100a of the depth map camera and which passes through the pixel 262. The distance of the point $W_3$ from the focal point 100a is equal to the depth of the pixel 262 defined in the depth map image. Similarly, when step S208 is repeated, pixel data generator 60 tests points $W_2$ and $W_3$ to determine if they lie on different sides of the virtual pixel viewing ray 170.

If it is determined at step S208 that the points $W_i$ and $W_{i-1}$ lie on different sides of the virtual pixel viewing ray 170, then processing proceeds to step S214, at which pixel data generator 60 performs processing to test whether there is a depth discontinuity between the surface structure represented by the points $W_i$ and $W_{i-1}$ (that is, whether the points $W_i$ and $W_{i-1}$ represent points on different surfaces, rather than the same surface).

More particularly, in this embodiment, at step S214, pixel data generator 60 tests whether the difference between the depths of the points $W_i$ and $W_{i-1}$ (that is the difference in the distances of the points from the focal point 100a of the depth map camera) is less than a threshold which, in this embodiment, is set to be the same as the focal length of the virtual camera.

If it is determined at step S214 that the difference in the depths of the points is not less than the threshold, and accordingly that a depth discontinuity probably exists, then processing proceeds to step S210, described above.

On the other hand, if it is determined at step S214 that the difference between the depths of the points is less than the threshold, then, at step S216, it is determined that the pixel viewing ray 170 intersects the surface structure represented by the pixels $W_i$ and $W_{i-1}$.

The processing described above therefore identifies, for the current segment, the surface structure intersected by the virtual pixel viewing ray 170 which is closest to the focal point 150a of the virtual camera (the closest intersected structure being identified because the pixels in the segment are considered in a "near-to-far" ordering along the projected ray 180 as described above).

Referring again to FIG. 13, if it is determined at step S170 that an intersection exists between the virtual pixel viewing ray 170 and surface structure represented by pixels in the current segment, then processing proceeds to step S178, at which the pixel data generator 60 updates the values in the Z-buffer 70 for the current pixel in the virtual image.

FIG. 17 shows the processing operations performed by the pixel data generator 60 at step S178.

Referring to FIG. 17, at step S240, pixel data generator 60 calculates the distance (that is, the depth) from the focal point 150a of the virtual camera of the intersection of the virtual pixel viewing ray 170 with the surface structure.

More particularly, referring to FIG. 16, in this embodiment, pixel data generator 60 notionally connects the points $W_i$ and $W_{i-1}$ which lie on different sides of the virtual pixel viewing ray 170 (points $W_3$ and $W_2$ in the example shown in FIG. 16) and calculates the point 256 at which the line connecting the points $W_i$ and $W_{i-1}$ intersects the virtual pixel viewing ray 170. The point 256 is then considered to be the position of the surface structure intersected by the virtual pixel viewing ray 170, and accordingly the distance of the point 256 from the focal point 150a of the virtual camera is calculated by the pixel data generator 60.

At step S242, pixel data generator 60 calculates an error value for the depth previously calculated at step S240. More particularly, in this embodiment, pixel data generator 60 calculates the error using the following equation:

$$\text{Error} = \pm K \times \text{depth from focal point of depth map camera} \quad (2)$$

where "K" is a constant, which, in this embodiment, is set to 0.01, and the depth from the focal point of the depth map camera is, in the example shown in FIG. 16, the distance of the point 256 from the focal point 100a.

At step S244, pixel data generator 60 tests whether the depth of the new intersection calculated at step S240 is greater than the current depth already stored in the Z-buffer 70 for the virtual image pixel being considered. More particularly, pixel data generator 60 tests whether:

$$\underset{depth}{New} - \underset{error}{associated} > \underset{depth}{existing} + \underset{error}{associated} \quad (3)$$

In this way, pixel data generator 60 checks that the new depth and the existing depth in the Z-buffer 70 are sufficiently separated that the associated errors do not overlap. This is illustrated by way of example in FIG. 18a, in which the new intersection is shown as point 270, the negative error associated with the position of the point 270 is represented by distance 272, the position of the intersection already stored in the Z-buffer 70 is shown as point 274, and the positive error associated with the position of point 274 is represented by distance 276.

If it is determined at step S244 that the new depth is greater than the depth already existing in the Z-buffer 70, then it is determined that the values in the Z-buffer 70 should not be updated. This is because the surface structure represented by the new intersection lies further from the virtual camera than the surface structure represented by the values already stored in the Z-buffer 70, and accordingly the surface structure represented by the new intersection will be occluded by the surface structure represented by the values already in the Z-buffer 70.

On the other hand, if it is determined at step S244 that the depth of the new intersection is not greater than the depth already in the Z-buffer 70 for the current virtual pixel, then, at steps S246 to S256, pixel data generator 60 performs steps to update the image and depth values stored in the Z-buffer 70 for the current virtual pixel.

More particularly, at step S246, pixel data generator 60 calculates a pixel image value for the new intersection. In this embodiment, the pixel image value is calculated by linearly interpolating between the image values of the pixels in the depth map image which produced the points $W_i$ and $W_{i-1}$ lying on different sides of the virtual pixel viewing ray 170, in accordance with the distance of the intersection (point 256 in FIG. 16) from each of the points $W_i$ and $W_{i-1}$. Thus, referring to FIG. 16 by way of example, pixel data generator 60 calculates a pixel image value for the point 256 by linearly interpolating between the image value of the pixel 260 in the depth map image 100 and the image value of the pixel 262 in the depth map image (since the pixel 260 and 262 were the pixels responsible for producing the points $W_2$ and $W_3$ which lie on opposite sides of the virtual pixel viewing ray 170). The linear interpolation is performed in accordance with the ratio of the distance of the point 256 from point $W_2$ to the distance of point 256 from point $W_3$. If the image values in the depth map image comprise a number of components (for example to define red, green and blue components) then the interpolation is performed for each respective component.

At step S248, pixel data generator 60 determines whether the depth of the new intersection 256 calculated at step S240 taking into account the error calculated at step S242 lies within the error limits of the current depth already stored for the virtual pixel in the Z-buffer 70. That is, pixel data generator 60 determines whether there is any overlap between the depth of the new intersection and its error and the existing intersection and its error, for example as shown in FIG. 18b or FIG. 18c.

If it is determined at step S248 that the depth of the new intersection is not within the error limits of the depth already in the Z-buffer 70, then the new intersection lies closer to the focal point 150a of the virtual camera and there is no overlap with the error limits of the existing depth in the Z-buffer 70, for example as shown in FIG. 18d. Accordingly, at step S250, pixel data generator 60 updates the data in the Z-buffer for the virtual pixel by writing the image value calculated at step S246, the depth value calculated at step S240 and the associated error value calculated at step S242 into the Z-buffer to replace the existing data for the virtual pixel.

On the other hand, if it is determined at step S248 that the depth of the new intersection is within the error limits of the current depth stored in the Z-buffer 70, then, at step S252, pixel data generator 60 combines the depth value and error of the new intersection with the depth value and error currently stored in the Z-buffer 70 to give a depth value and error for a combined point. More particularly, in this embodiment, pixel data generator 60 combines the depth values and associated errors using a conventional Kalman filter.

At step S254, pixel data generator 60 combines the image value calculated at step S246 with the image value for the virtual pixel currently stored in the Z-buffer 70.

Again, in this embodiment, pixel data generator 60 combines the image values using a conventional Kalman filter, in which the same weights used to combine the depth and error values at step S252 are used to combine the image values.

At step S256, pixel data generator 60 writes the image value calculated at step S254 and the depth and error values calculated at step S252 into the Z-buffer 70 for the current virtual pixel to replace the data already stored in the Z-buffer 70 for that pixel.

Referring again to FIG. 13, if it is determined at step S170 that the pixels in the current segment of the depth map image do not represent surface structure which is intersected by the virtual pixel viewing ray 170, pixel data generator 60 performs processing to test whether another segment in the depth map image contains pixels representing surface structure intersected by the virtual pixel viewing ray 170.

More particularly, at step S172, pixel data generator 60 determines whether there is another segment within the current level of sub-division being considered which contains part of the projected ray 180.

If it is determined at step S172 that there is no further segment at the same sub-division level which contains part of the projected ray, then, at step S174, pixel data generator 60 determines whether there is a further segment at the preceding sub-division level which contains part of the projected ray 180.

If it is determined at step S174 that there is no further segment within the preceding sub-division level containing part of the projected ray 180, then all of the segments which contain part of the projected ray have been tested, and no further testing is necessary.

On the other hand, if it is determined at step S172 that there is a further segment at the current level of sub-division, or at step S174 that there is a further segment at the preceding level of sub-division, which contains part of the projected ray 180, then it is necessary to test the further segment to determine whether it contains pixels representing surface structure intersected by the virtual pixel viewing ray 170.

Before testing the pixels in the further segment, however, at step S176, pixel data generator 60 tests whether the pixels at the boundary between the current segment and the further segment represent surface structure intersected by the virtual pixel viewing ray 170. More particularly, pixel data generator 60 tests whether the last pixel containing the projected ray 180 in the current segment and the first pixel containing the projected ray 180 in the next segment represents surface structure intersected by the virtual pixel viewing ray 170.

FIG. 19 shows the processing operations performed at step S176 by pixel data generator 60.

Referring to FIG. 19, at step S270, pixel data generator 60 determines whether the position of a point $W_i$ has previously been defined at step S204 or S206 (FIG. 15) for the last pixel in the current segment having a depth which is not "unknown" which is intersected by the projected ray 180.

If it is determined at step S270 that the point $W_i$ has not been defined for the last pixel, then, at step S272, pixel data generator 60 carries out the processing previously described above at step S206 to define a point $W_L$ lying on the line connecting the virtual pixel viewing ray 170 with the focal point 100a of the depth map camera which passes through the last pixel in the current segment having a depth which is not "unknown" which is intersected by the projected ray 180 at a distance equal to the depth of the pixel.

On the other hand, if it is determined at step S270 that the point $W_i$ has already been defined for the last pixel, then the processing performed at step S272 is omitted.

At step S274, pixel data generator 60 defines a point $W_F$ for the first pixel in the further segment which is intersected by the projected ray 180 which does not have an "unknown" depth value. More particularly, pixel data generator 60 defines a point $W_F$ along the line connecting the virtual pixel viewing ray 170 with the focal point 100a of the depth map camera which passes through the centre of the first pixel in the further segment having a depth which is not "unknown" which is intersected by the projected ray 180 at a distance equal to the depth defined for the pixel in the depth map image.

At step S276, pixel data generator 60 tests whether the points $W_F$ and $W_L$ lie on different sides of the virtual pixel viewing ray 170. The processing performed at step S276 corresponds to the processing performed at step S114, with the points $W_F$ and $W_L$ replacing the points $C_{MIN}$ and $C_{MAX}$, and accordingly will not be described again here.

If it is determined at step S276 that the points $W_F$ and $W_L$ lie on different sides of the virtual pixel viewing ray 170, then, at step S278, pixel data generator 60 determines whether the difference in the depths of the points $W_F$ and $W_L$ is less than a threshold, in order to determine whether a depth discontinuity exists. The processing performed at step S278 is the same as that described above at step S214, and accordingly will not be described again here.

If it is determined at step S278 that the difference in the depths of the points $W_F$ and $W_L$ is not less than the threshold, or if it was previously determined at step S276 that the points $W_F$ and $W_L$ lie on the same side of the virtual pixel viewing ray 170, then, at step S280, it is determined that the last pixel in the current segment and the first pixel in the next segment do not represent surface structure intersected by the virtual pixel viewing ray 170.

On the other hand, if it is determined at step S278 that the difference in the depths of the points $W_F$ and $W_L$ is less than the threshold, then, at step S282, it is determined that the virtual pixel viewing ray 170 intersects the surface structure represented by the last pixel in the current segment and the first pixel in the next segment.

Referring again to FIG. 13, if it is determined at step S176 that the last pixel in the current segment and the first pixel in the next segment represent surface structure intersected by the virtual pixel viewing ray 170, then, at step S178, pixel data generator 60 updates the values stored in the Z-buffer 70 for the current virtual pixel, in the manner previously described above.

On the other hand, if it is determined at step S176 that the last pixel in the current segment and the first pixel in the next segment do not represent surface structure intersected by the virtual pixel viewing ray 170, processing returns to step S152 so that the pixels within the next segment can be considered in the manner previously described above.

In this way, because the segments within the depth map image are considered in a near-to-far order (that is, in an order defined by an increasing depth of the virtual pixel viewing ray 170 when projected into the depth map image) and because the pixels within a segment at the lowest level of sub-division are also considered in a similar near-to-far order, the processing described above identifies the surface structure represented by pixels in the depth map image and intersected by the virtual pixel viewing ray 170 which is nearest to the virtual camera (or determines that the pixels in the depth map image do not represent surface structure intersected by the virtual pixel viewing ray 170).

Referring again to FIG. 9, after processing for the current depth map image has been completed at step S124 for the current pixel in the virtual image, at step S126, pixel data generator 60 determines whether there is another depth map image to be processed. Steps S100 to S126 are repeated until all of the depth map images have been processed in the manner described above.

However, because the processing order of the depth map images was defined at step S82 in terms of increasing distance of the depth map images from the virtual camera, following the processing of the first depth map image, image and depth values will have been calculated for many of the pixels in the virtual image. Accordingly, at step S100, the virtual pixel viewing ray 170 is only projected to the current depth defined in the Z-buffer 70. Therefore, for the second and subsequent depth map images to be processed, when the virtual pixel viewing ray 170 is projected into the depth map image at step S104, the resulting projected ray 180 is likely to intersect fewer pixels than in the first depth map image, thereby reducing the amount of processing necessary to test whether the intersected pixels represent surface structure intersected by the virtual viewing ray 170.

When all of the depth map images have been processed in the manner described above for the current virtual pixel, then, at step S128, pixel data generator 60 determines whether there is another pixel in the virtual image, and steps S100 to S128 are repeated until each pixel in the virtual image has been processed in the manner described above.

Referring again to FIG. 5, having generated pixel data for the virtual image at step S56 as described above, at step S58, central controller 20 causes display processor 80 to read the pixel image values from Z-buffer 70 and to display the virtual image to the user on display device 4.

At step S60, central controller 20 determines whether further viewing instructions have been received from the user, and steps S40 to S60 are repeated until no further viewing instructions are input by the user.

A number of modifications are possible to the embodiment described above.

For example, in the embodiment above, at steps S16 to S20 (FIG. 2) each depth map image is recursively sub-divided and the maximum and minimum depths are stored for each sub-divided segment at each level of sub-division.

Thus, in the embodiment above, sub-division is performed in a "top-down" approach starting from the depth map image as a whole and creating smaller segments at each successive level of sub-division. Instead, however, the processing may be performed in a bottom-up" approach in which segments of size 2 by 2 pixels are considered to begin with followed by segments of size 4 by 4 pixels and so on up to the size of the depth map image as a whole.

In this way, when determining the maximum (or minimum) depth for a segment it is only necessary to select the largest maximum (or minimum) value of the segments therein.

In the embodiment above, at step S100 (FIG. 9) the next pixel in the virtual image is considered and at steps S102 to S126 processing is performed for each depth map image for that pixel. Instead, however, each pixel for the virtual image may be processed for a given depth map image before repeating the processing for each pixel for the next depth map image.

In the embodiment above, at step S176 (FIG. 13), a test is carried out to determine whether the pixels intersected by the projected ray 180 which span the boundary between two sub-division segments represent surface structure intersected by the virtual pixel viewing ray 170. Instead, however, each depth map image may be sub-divided to produce segments which overlap.

In the embodiment above, at step S246 (FIG. 17), an image value for a virtual pixel is calculated by interpolating between the image values of the two pixels in the depth map image which produced the points $W_i$ and $W_{i-1}$ lying on different sides of the virtual pixel viewing ray 170. However, an image value for the virtual pixel may be calculated using the image value of just one of these two pixels in the depth map image. For example, the image value for the virtual pixel may be set to be the same as the image value of the pixel in the depth map image which produced the point $W_i$ or $W_{i-1}$ which is closest to the virtual pixel viewing ray 170.

In the embodiment above, an example is given in which the depth map images are of static objects and a single depth map image from each depth map camera is processed. However, depth map images may be received continuously from the depth map cameras to record the movements of objects, with depth map images recorded at the same time being processed to generate a virtual image.

Input depth map images may be stored using an appropriate 2D data compression scheme. For example, a quadtree representation could be used.

Once a virtual depth map image has been generated in the manner described in the embodiment above, it is possible to input a further depth map image and, in response, to update the virtual depth map image.

In the embodiment above, processing is described for visible light images. However, the processing is applicable to other forms of waves, particularly electromagnetic waves (for example, infrared, x-rays etc).

In the embodiment above, processing is performed by a computer using processing routines defined by programming instructions. However, some, or all, of the processing could be performed using hardware.

What is claimed is:

1. A method of processing data defining a plurality of depth map images, each comprising pixel image data and corresponding depth data for an object for respective viewing conditions, and data defining the viewing conditions, to generate pixel image data for an output image of the object from output viewing conditions different to the respective viewing conditions of each depth map image, said method comprising the steps of:

for a given pixel in the output image processing the data so as to notionally,
   define a pixel viewing ray in three-dimensions for the given pixel in dependence upon the output viewing conditions and the position of the given pixel in the output image;
   project the pixel viewing ray into at least one of the depth map images;
   identify pixels in the at least one depth map image which are intersected by the projected ray; and
   identify at least one of the pixels intersected by the projected ray which represents a part of the surface of the object which is intersected by the pixel viewing ray; and
generating an image value for the given pixel in the output image in dependence upon the image value of the at least one identified pixel.

2. A method according to claim 1, wherein pixels intersected by the projected ray which represent a part of the surface of the object which is intersected by the pixel viewing ray are identified by processing the depth values of the pixels intersected by the projected ray and the data defining the viewing conditions of the at least one depth map image to identify consecutive intersected pixels, one of which represents a part of the object surface on a first side of the pixel viewing ray and the other of which represents a part of the object surface on a second side of the pixel viewing ray.

3. A method according to claim 2, wherein the pixel representing the part of the object surface on the first side and the pixel representing the part of the object surface on the second side are tested to determine whether there is an anomalous depth between the parts of the object surface represented by the pixels, and, if an anomalous depth is determined to exist, the pixels are not used to generate an image value for the given pixel in the output image.

4. A method according to claim 3, wherein the difference between the respective depths of the pixel representing the part of the object surface on the first side and the pixel representing the part of the object surface on the second side is calculated and, if the difference exceeds a threshold, it is determined that there is an anomalous depth therebetween.

5. A method according to claim 1, wherein the at least one pixel is identified which represents the part of the object surface intersected by the pixel viewing ray which is closest to the given pixel in the output image.

6. A method according to claim 5, wherein processing is carried out to consider the pixels intersected by the projected ray in an order corresponding to an increasing distance of the pixel viewing ray from the given pixel in the output image to identify the at least one pixel.

7. A method according to claim 1, wherein the pixels in segments of a depth map image at different levels of sub-division are tested to identify a segment containing pixels which can represent a part of the surface of the object which is intersected by the pixel viewing ray for further processing and to exclude from further processing a segment if it contains pixels which cannot represent a part of the surface of the object which is intersected by the pixel viewing ray.

8. A method according to claim 7, wherein segments at successive levels of sub-division are tested to identify the smallest segment containing pixels which can represent a part of the surface of the object which is intersected by the pixel viewing ray.

9. A method according to claim 8, wherein the largest segment is the depth map image as a whole, and the smallest segment is of size 2 by 2 pixels.

10. A method according to claim 7, wherein the pixels in a segment are tested using the maximum depth and the minimum depth of the pixels in the segment.

11. A method according to claim 10, wherein the pixels in a segment are tested by defining points for at least two of the pixels at the minimum depth and maximum depth for the pixels in the segment as a whole, and comparing the positions of the defined points with the pixel viewing ray.

12. A method according to claim 1, wherein
    a Z-buffer is maintained for the output image,
    the pixel viewing ray is notionally projected in turn into a plurality of the depth map images, and
    the data in the Z-buffer for the given pixel is amended in dependence upon the depth from the given pixel of the nearest part of the object surface which is intersected by the pixel viewing ray identified from each of the depth map images into which the ray is projected.

13. A method according to claim 12, wherein the pixel viewing ray is notionally projected into each of the plurality of depth map images with a length defined by the current depth in the Z-buffer for the given pixel.

14. A method according to claim 12, wherein an uncertainty value is calculated for the position of the nearest part of the object surface which is intersected by the pixel viewing ray identified from each of the depth map images, and the uncertainty values are taken into consideration in determining whether to amend the data in the Z-buffer.

15. A method according to claim 1, wherein the pixel viewing ray is notionally projected into a plurality of depth map images in an order defined in dependence upon the distance of each of the depth map images from the output image.

16. A method according to claim 1, wherein at least two pixels are identified in a depth map image which represent the part of the object surface to be represented in the given pixel, and the step of generating an image value for the given pixel comprises interpolating between the image values of the identified pixels.

17. A method according to claim 1, wherein the viewing conditions define a position, orientation and focal point.

18. A method according to claim 1, wherein the pixel image value comprises one or more values defining a color.

19. A method according to claim 1, further comprising the step of outputting a signal conveying the generated image value for the given pixel.

20. A method according to claim 1, further comprising the step of making a recording of the image value for the given pixel either directly or indirectly.

21. A method according to claim 1, wherein
    the plurality of depth map images comprise respective views of the object from the different directions relative to the object,
    the pixel viewing ray is projected into the at least one depth map image to give a two-dimensional projected ray in a plane of the at least one depth map image, and
    pixels are identified in the at least one depth map image which are intersected by the two-dimensional projected ray.

22. A method of generating pixel image data for a virtual image of an object from depth map images of the object, wherein an image value for a pixel in the virtual image is generated by the steps of:
    defining a ray through the pixel;
    testing the depth map images to identify a pixel or pixels in a depth map image which represents the object surface closest to the pixel which is intersected by the ray, wherein pixels in segments at different levels of subdivision of at least one of the depth map images are tested to identify a segment containing pixels which can represent a part of the surface of the object which is intersected by the ray for further testing and to exclude from further testing a segment if it contains pixels which cannot represent a part of the surface of the object which is intersected by the ray; and
    calculating an image value in dependence upon the image value of the identified pixel or pixels.

23. An image processing method for removing an object from a scene to generate image data for a virtual image without the object present, said method comprising the steps of:
    processing data defining a plurality of depth map images, each depth map image comprising pixel image values and corresponding depth values for respective viewing conditions of a scene containing a plurality of objects, to identify, in each depth map image, pixels corresponding to the object to be deleted as pixels to be ignored in subsequent processing; and
    combining the data from the depth map images to generate image data for the virtual image.

24. An image processing method for adding an object to a scene to generate image data for a virtual image at a user-selected viewing position and orientation with the object present, said method comprising the steps of:
receiving data defining a plurality of depth map images of the scene, each depth map image comprising image data and corresponding depth data for respective viewing conditions; and
combining data from the depth map images of the scene and from a depth map image of the object defined for the user-selected viewing position and orientation of the virtual image to generate image data for the virtual image.

25. An apparatus for processing data defining a plurality of depth map images, each comprising pixel image data and corresponding depth data for an object for respective viewing conditions, and data defining the viewing conditions, to generate pixel image data for an output image of the object from output viewing conditions different to the respective viewing conditions of each depth map image, said apparatus comprising:
a pixel identifier for performing processing for a given pixel in the output image to process the data so as to notionally;
define a pixel viewing ray in three-dimensions for the given pixel in dependence upon the output viewing conditions and the position of the given pixel in the output image;
project the pixel viewing ray into at least one of the depth map images;
identify pixels in the at least one depth map image which are intersected by the projected ray; and
identify at least one of the pixels intersected by the projected ray which represents a part of the surface of the object which is intersected by the pixel viewing ray; and
an image value generator for generating an image value for the given pixel in the output image in dependence upon the image value of the at least one identified pixel.

26. An apparatus according to claim 25, wherein said pixel identifier is arranged to identify pixels intersected by the projected ray which represent a part of the surface of the object which is intersected by the pixel viewing ray by processing the depth values of the pixels intersected by the projected ray and the data defining the viewing conditions of the at least one depth map image to identify consecutive intersected pixels, one of which represents a part of the object surface on a first side of the pixel viewing ray and the other of which represents a part of the object surface on a second side of the pixel viewing ray.

27. An apparatus according to claim 26, wherein said pixel identifier is arranged to perform processing to test the pixel representing the part of the object surface on the first side and the pixel representing the part of the object surface on the second side to determine whether there is an anomalous depth between the parts of the object surface represented by the pixels, and, wherein the apparatus is arranged not to use pixels to generate an image value for the given pixel in the output image if an anomalous depth is determined to exist therebetween.

28. An apparatus according to claim 27, wherein said pixel identifier is arranged to perform processing to calculate the difference between the respective depths of the pixel representing the part of the object surface on the first side and the pixel representing the part of the object surface on the second side and, if the difference exceeds a threshold, to determine that there is an anomalous depth therebetween.

29. An apparatus according to claim 25, wherein said pixel identifier is arranged to perform processing to identify the at least one pixel which represents the part of the object surface intersected by the pixel viewing ray which is closest to the given pixel in the output image.

30. An apparatus according to claim 29, wherein said pixel identifier is arranged to perform processing to consider the pixels intersected by the projected ray in an order corresponding to an increasing distance of the pixel viewing ray from the given pixel in the output image to identify the at least one pixel.

31. An apparatus according to claim 25, wherein said pixel identifier is arranged to perform processing to test the pixels in segments of a depth map image at different levels of sub-division to identify a segment containing pixels which can represent a part of the surface of the object which is intersected by the pixel viewing ray for further processing and to exclude from further processing a segment if it contains pixels which cannot represent a part of the surface of the object which is intersected by the pixel viewing ray.

32. An apparatus according to claim 31, wherein said pixel identifier is arranged to perform processing to test segments at successive levels of sub-division to identify the smallest segment containing pixels which can represent a part of the surface of the object which is intersected by the pixel viewing ray.

33. An apparatus according to claim 32, wherein said pixel identifier is arranged to perform processing such that the largest segment is the depth map image as a whole, and the smallest segment is of size 2 by 2 pixels.

34. An apparatus according to claim 31, wherein said pixel identifier is arranged to perform processing to test the pixels in a segment using the maximum depth and the minimum depth of the pixels in the segment.

35. An apparatus according to claim 34, wherein said pixel identifier is arranged to perform processing to test the pixels in a segment by defining points for at least two of the pixels at the minimum depth and maximum depth for the pixels in the segment as a whole, and comparing the positions of the defined points with the pixel viewing ray.

36. An apparatus according to claim 25, wherein
a Z-buffer is provided for storing data for the output image,
said pixel identifier is arranged to perform processing to notionally project the pixel viewing ray in turn into a plurality of the depth map images, and
a Z-buffer updater is provided for amending the data in the Z-buffer for the given pixel in dependence upon the depth from the given pixel of the nearest part of the object surface which is intersected by the pixel viewing ray identified from each of the depth map images into which the ray is projected.

37. An apparatus according to claim 36, wherein said pixel identifier is arranged to perform processing to notionally project the pixel viewing ray into each of the plurality of depth map images with a length defined by the current depth in the Z-buffer for the given pixel.

38. An apparatus according to claim 36, wherein an uncertainty value calculator is provided for calculating an uncertainty value for the position of the nearest part of the object surface which is intersected by the pixel viewing ray identified from each of the depth map images, and wherein said Z-buffer updater is arranged to amend the data in the Z-buffer in dependence upon calculated uncertainty values.

39. An apparatus according to claim 25, wherein said pixel identifier is arranged to perform processing to notionally project the pixel viewing ray into a plurality of depth map images in an order defined in dependence upon the distance of each of the depth map images from the output image.

40. An apparatus according to claim 25, wherein said pixel identifier is arranged to perform processing to identify at least two pixels in a depth map image which represent the part of the object surface to be represented in the given pixel, and the image value generator comprises an interpolater for interpolating between the image values of the identified pixels.

41. An apparatus according to claim 25, wherein the viewing conditions define a position, orientation and focal point.

42. An apparatus according to claim 25, wherein the pixel image value comprises one or more values defining a color.

43. An apparatus according to claim 25, wherein the apparatus is operable to process data defining a plurality of depth map images comprising respective views of the object from different directions relative to the object, and wherein said pixel identifier is operable to project the pixel viewing ray into the at least one depth map image to give a two-dimensional projected ray in a plane of the at least one depth map image, and identify pixels in the at least one depth map image which are intersected by the two-dimensional projected ray.

44. An apparatus for generating pixel image data for a virtual image of an object from depth map images of the object, said apparatus comprising:
- a ray definer for defining a ray through a pixel in the virtual image;
- a depth map tester for testing the depth map images to identify a pixel or pixels in a depth map image which represents the object surface closest to the pixel which is intersected by the ray, wherein said depth map tester is operable to test pixels in segments of a depth map image at different levels of subdivision to identify for further testing each segment containing pixels which can represent a part of the surface of the object which is intersected by the ray and to exclude from further testing each segment containing pixels which cannot represent a part of the surface of the object which is intersected by the ray; and
- an image value calculator for calculating an image value in dependence upon the image value of the identified pixel or pixels.

45. An image processing apparatus for removing an object from a scene to generate image data for a virtual image without the object present, said apparatus comprising:
- a depth map processor for processing data defining a plurality of depth map images, each depth map image comprising pixel image values and corresponding depth values for respective viewing conditions of a scene containing a plurality of objects, to identify, in each depth map image, pixels corresponding to the object to be deleted as pixels to be ignored in subsequent processing; and
- a virtual image data generator for combining the data from the depth map images to generate image data for the virtual image.

46. An image processing apparatus for adding an object to a scene to generate image data for a virtual image at a user-selected viewing position and orientation with the object present, said apparatus comprising:
- a depth map data receiver for receiving data defining a plurality of depth map images of the scene, each depth map image comprising image data and corresponding depth data for respective viewing conditions; and
- a depth map data combiner for combining data from the depth map images of the scene and from a depth map image of the object defined for the user-selected viewing position and orientation of the virtual image to generate image data for the virtual image.

47. An apparatus for processing data defining a plurality of depth map images, each comprising pixel image data and corresponding depth data for an object for respective viewing conditions, and data defining the viewing conditions, to generate pixel image data for an output image of the object from output viewing conditions different to the respective viewing conditions of each depth map image, said apparatus comprising:
- pixel identifying means for performing processing for a given pixel in the output image to process the data so as to notionally:
  - define a pixel viewing ray in three-dimensions for the given pixel in dependence upon the output viewing conditions and the position of the given pixel in the output image;
  - project the pixel viewing ray into at least one of the depth map images;
  - identify pixels in the at least one depth map image which are intersected by the projected ray; and
  - identify at least one of the pixels intersected by the projected ray which represents a part of the surface of the object which is intersected by the pixel viewing ray; and
- means for generating an image value for the given pixel in the output image in dependence upon the image value of the at least one identified pixel.

48. An apparatus for generating pixel image data for a virtual image of an object from depth map images of the object, said apparatus comprising:
- means for defining a ray through a pixel in the virtual image;
- means for testing the depth map images to identify a pixel or pixels in a depth map image which represents the object surface closest to the pixel which is intersected by the ray, wherein said means for testing the depth map images is operable to test pixels in segments of a depth map image at different levels of subdivision to identify for further testing each segment containing pixels which can represent a part of the surface of the object which is intersected by the ray and to exclude from further testing each segment containing pixels which cannot represent a part of the surface of the object which is intersected by the ray; and
- means for calculating an image value in dependence upon the image value of the identified pixel or pixels.

49. An image processing apparatus for removing an object from a scene to generate image data for a virtual image without the object present, said apparatus comprising:
- means for processing data defining a plurality of depth map images, each depth map image comprising pixel image values and corresponding depth values for respective viewing conditions of a scene containing a plurality of objects, to identify, in each depth map image, pixels corresponding to the object to be deleted as pixels to be ignored in subsequent processing; and
- means for combining the data from the depth map images to generate image data for the virtual image.

50. An image processing apparatus for adding an object to a scene to generate image data for a virtual image at a user-selected viewing position and orientation with the object present, said apparatus comprising:

means for receiving data defining a plurality of depth map images of the scene, each depth map image comprising image data and corresponding depth data for respective viewing conditions; and means for combining data from the depth map images of the scene and from a depth map image of the object defined for the user-selected viewing position and orientation of the virtual image to generate image data for the virtual image.

51. A method of generating pixel image data for a virtual image of an object from depth map images of the object, wherein an image value for a pixel in the virtual image is generated by the steps of:

defining a ray through the pixel;

testing the depth map images to identify a pixel or pixels in a depth map image which represents an object surface closest to the pixel which is intersected by the ray, wherein a Z-buffer is maintained for an output image and an uncertainty value is calculated for a nearest part of an object which is intersected by a ray identified from different depth map images, and uncertainty values are taken into consideration in determining whether to amend data in the Z-buffer; and calculating an image value in dependence upon the image value of the pixel or pixels identified.

52. An apparatus for generating pixel image data for a virtual image of an object from depth map images of the object, said apparatus comprising:

a ray definer for defining a ray through a pixel in the virtual image;

a depth map tester for testing the depth map images to identify a pixel or pixels in a depth map image which represents an object surface closest to the pixel which is intersected by the ray; and an image value calculator for calculating an image value in dependence upon an image value of the pixel or pixels identified, wherein the apparatus includes a Z-buffer, and said depth map tester is operable to update the Z-buffer for the virtual image, to calculate an uncertainty value for a nearest part of an object which is intersected by the ray identified from different depth map images, and to take uncertainty values into consideration when determining whether to amend data in the Z-buffer.

53. An apparatus for generating pixel image data for a virtual image of an object from depth map images of the object, said apparatus comprising:

means for defining a ray through a pixel in the virtual image;

means for testing the depth map images to identify a pixel or pixels in a depth map image which represents an object surface closest to a pixel which is intersected by the ray;

means for calculating an image value in dependence upon an image value of the pixel or pixels identified; and a Z-buffer, wherein said means for testing the depth map images is operable to update said Z-buffer for the virtual image, to calculate an uncertainty value for a nearest part of an object which is intersected by a ray identified from different depth map images, and to take uncertainty values into consideration when determining whether to amend data in said Z-buffer.

54. A method of generating pixel image data for a virtual image of an object from depth map images of the object, wherein an image value for a pixel in the virtual image is generated by the steps of:

defining a ray through the pixel;

testing the depth map images in an order defined in dependence upon a distance of each of the depth map images from the virtual image to identify a pixel or pixels in a depth map image which represents an object surface closest to the pixel which is intersected by the ray; and calculating an image value in dependence upon an image value of the pixel or pixels identified.

55. An apparatus for generating pixel image data for a virtual image of an object from depth map images of the object, said apparatus comprising:

a ray definer for defining a ray through a pixel in the virtual image;

a depth map tester for testing the depth map images in an order defined in dependence upon a distance of each of the depth map images from the virtual image to identify a pixel or pixels in a depth map image which represents an object surface closest to the pixel which is intersected by the ray; and an image value calculator for calculating an image value in dependence upon an image value of the pixel or pixels identified.

56. An apparatus for generating pixel image data for a virtual image of an object from depth map images of the object, said apparatus comprising:

means for defining a ray through a pixel in the virtual image;

means for testing the depth map images in an order defined in dependence upon a distance of each of the depth map images from the virtual image to identify a pixel or pixels in a depth map image which represents an object surface closest to the pixel which is intersected by the ray; and means for calculating an image value in dependence upon an image value of the pixel or pixels identified.

57. A data storage device storing instructions for causing a programmable processing apparatus to become operable to perform a method according to any one of claims 1, 22, 23 and 24.

58. A data storage device storing instructions for causing a programmable processing apparatus to become configured as an apparatus as set forth in any one of claims 25 and 44–50.

59. A signal conveying instructions for causing a programmable processing apparatus to become operable to perform a method according to any one of claims 1, 22, 23 and 24.

60. A signal conveying instructions for causing a programmable processing apparatus to become configured as an apparatus as set forth in any one of claims 24 and 44–50.

* * * * *

UNITED STATES PATENT AND TRADEMARK OFFICE
CERTIFICATE OF CORRECTION

PATENT NO. : 6,791,540 B1
DATED : September 14, 2004
INVENTOR(S) : Adam Michael Baumberg It is certified that error appears in the above-identified patent and that said Letters Patent is hereby corrected as shown below:

Title page,
Item [75], Inventor, "Bracknell" should read -- Guildford --.
Item [56], References Cited, OTHER PUBLICATIONS, delete $2^{nd}$ occurrence of "An Anti-Aliasing Technique", "By Swan et al.,".
"Construction" reference, "Stero" should read -- Stereo --.

Column 1,
Line 9, "etc" should read -- etc. --; and
Line 52, "et al" should read -- et al. --.

Column 2,
Line 20, "et al" should read -- et al. --.

Column 5,
Line 27, "user." should read -- user --.

Column 8,
Line 3, "can not" should read -- cannot --.

Column 19,
Line 50, "represents" should read -- represent --.

Column 22,
Line 42, "to" should read -- from --; and
Line 46, "notionally," should read -- notionally: --.

Column 24,
Line 34, "are" should read -- is --.

Column 25,
Line 24, "notionally;" should read -- notionally: --.

UNITED STATES PATENT AND TRADEMARK OFFICE
CERTIFICATE OF CORRECTION

PATENT NO. : 6,791,540 B1
DATED : September 14, 2004
INVENTOR(S) : Adam Michael Baumberg It is certified that error appears in the above-identified patent and that said Letters Patent is hereby corrected as shown below:

Column 28,
Line 11, "to" should read -- from --.

Column 30,
Line 61, "claims 24" should read -- claim 25 --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,791,540 B1 |
| DATED | : September 14, 2004 |
| INVENTOR(S) | : Adam Michael Baumberg |

Page 1 of 1

It is certified that error appears in the above-identified patent and that said Letters Patent is hereby corrected as shown below:

Title page,
Item [75], Inventor, "Guildford" should read -- Bracknell --.
Item [56], References Cited, OTHER PUBLICATIONS,
"Construction Virtual World" reference, "Construction Virtual World" should read
-- Constructing Virtual Worlds --.

Column 24,
Line 34, "which is intersected" should read -- which are intersected --.

Signed and Sealed this

Seventh Day of February, 2006

JON W. DUDAS
*Director of the United States Patent and Trademark Office*